(12) United States Patent
Nishio et al.

(10) Patent No.: US 11,940,139 B2
(45) Date of Patent: Mar. 26, 2024

(54) LIGHTING DEVICE AND LIGHTING METHOD

(71) Applicant: DAI NIPPON PRINTING CO., LTD., Tokyo (JP)

(72) Inventors: Shumpei Nishio, Tokyo (JP); Toshiyuki Nakai, Tokyo (JP); Makio Kurashige, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 100 days.

(21) Appl. No.: 17/622,888

(22) PCT Filed: Jun. 29, 2020

(86) PCT No.: PCT/JP2020/025552
§ 371 (c)(1),
(2) Date: Dec. 27, 2021

(87) PCT Pub. No.: WO2020/262698
PCT Pub. Date: Dec. 30, 2020

(65) Prior Publication Data
US 2022/0228720 A1     Jul. 21, 2022

(30) Foreign Application Priority Data
Jun. 28, 2019   (JP) ................................ 2019-121715

(51) Int. Cl.
*F21V 3/00* (2015.01)
*F21V 5/00* (2018.01)
(Continued)

(52) U.S. Cl.
CPC ................ *F21V 3/00* (2013.01); *F21V 5/008* (2013.01); *G02B 26/101* (2013.01); *F21Y 2113/10* (2016.08); *F21Y 2115/30* (2016.08)

(58) Field of Classification Search
CPC . F21K 9/60; F21V 13/12; F21V 14/04; F21V 3/00; F21Y 2113/10;
(Continued)

(56) References Cited

U.S. PATENT DOCUMENTS 7,972,009 B2    7/2011   Yamauchi et al.
2006/0033009 A1*   2/2006   Kobayashi ........... H04N 9/3129
                                                 348/E9.026
(Continued)

FOREIGN PATENT DOCUMENTS

JP       2006-053495 A      2/2006
JP         4290095 B         2/2006
(Continued)

OTHER PUBLICATIONS

English translation of the International Preliminary Report dated Jan. 6, 2022, for the PCT Application No. PCT/JP2020/025552.
(Continued)

*Primary Examiner* — Zheng Song
(74) *Attorney, Agent, or Firm* — Michael Best & Friedrich LLP

(57) ABSTRACT

A lighting device (1) include a light source (2) that emits coherent light, a scanner (5) that causes the coherent light emitted from the light source to move, a first optical system (6) that regulates an optical path of the coherent light from the scanner, a first optical member (7) that causes the coherent light from the first optical system to diffuse, and a second optical system (8) that regulates an optical path of the coherent light from the first optical member. A lighting zone (LZ) on a plane of projection (PP) is illuminated with the coherent light emitted from the second optical system. An irradiance [W/m2] in a plane orthogonal to an optical axis of the coherent light irradiated on the lighting zone is non-discrete.

18 Claims, 18 Drawing Sheets

(51) Int. Cl.
*G02B 26/10* (2006.01)
*F21Y 113/10* (2016.01)
*F21Y 115/30* (2016.01)

(58) Field of Classification Search
CPC ............ F21Y 2115/30; G02B 19/0028; G02B 19/0052; G02B 26/0833; G02B 26/101; G02B 27/0944; G02B 27/48; G02B 5/02; G02B 5/32; H04N 9/3129
See application file for complete search history.

(56) References Cited

U.S. PATENT DOCUMENTS

| | | | | |
|---|---|---|---|---|
| 2009/0040467 A1* | 2/2009 | Yamauchi | ............... | G02B 27/48 353/38 |
| 2009/0168134 A1* | 7/2009 | Nojima | ................ | H04N 9/3129 359/214.1 |
| 2010/0020288 A1* | 1/2010 | Yurlov | ................... | G02B 27/48 353/20 |
| 2014/0043591 A1* | 2/2014 | Kurashige | ............ | G03H 1/2286 353/85 |
| 2014/0118702 A1* | 5/2014 | Taniguchi | ............ | H04N 9/3135 353/38 |
| 2014/0133018 A1* | 5/2014 | Matsubara | ........... | G03B 21/625 359/448 |
| 2015/0036108 A1* | 2/2015 | Taniguchi | ............ | G02B 26/125 353/102 |
| 2017/0108704 A1* | 4/2017 | Ishida | .................... | G02B 27/48 |
| 2018/0259157 A1 | 12/2018 | Nishio et al. | | |
| 2020/0192280 A1* | 6/2020 | Kim | .................. | G02B 27/0172 |
| 2021/0072553 A1* | 3/2021 | Danziger | ............ | G02B 27/283 |

FOREIGN PATENT DOCUMENTS

| | | |
|---|---|---|
| JP | 2009-042372 A | 2/2009 |
| JP | 2010-197955 A | 9/2010 |
| JP | 2012-220931 A | 11/2012 |
| JP | 2018-177015 A | 11/2018 |
| WO | WO2012/033170 A1 | 3/2012 |

OTHER PUBLICATIONS

English translation of International Search Report dated Dec. 30, 2020 for the corresponding PCT Application No. PCT/JP2020/025552.

Extended European Search Report dated Jul. 7, 2023, for the corresponding Patent Application No. 20833086.0.

Japanese Office Action dated Sep. 8, 2023, for JP 2021-528304, which is a corresponding Japanese patent application, with machine translation.

* cited by examiner

LIGHTING DEVICE AND LIGHTING METHOD

CROSS-REFERENCE TO RELATED APPLICATIONS

This application is entering into the national phase of PCT Application No. PCT/JP2020/025552, filed on Jun. 29, 2020. Further, this application claims the benefit of priority from Japanese Application Number 2019-121715, filed on Jun. 28, 2019, the entire contents of which are incorporated herein by reference.

TECHNICAL FIELD

The present disclosure relates to a lighting device and a lighting method.

BACKGROUND ART

A laser light source emits coherent light. In general, a laser light source has the following advantages. A laser light source has a smaller light-emitting area than an LED (light emitting device). When given a directivity, a laser light source can irradiate light to a distant place. A laser light source has a longer life than a high-pressure mercury lamp or other lamps. A laser light source allows miniaturization of an optical system. A laser light source consumes little electricity. With all these factors, lighting devices and projection devices including laser light sources are coming into wider use.

Conventionally, as disclosed in Japanese Patent No. 4290095, there has been proposed a lighting device including a laser light source. This lighting device includes a light source, scanning means for causing light to move, a first optical system, a second optical system, and an optical member. The light source emits light having coherence. The first optical system causes an intermediate image to be formed by the light from the scanning means. The second optical system causes the light from the intermediate image to form an image on a display surface that really exists. The optical member is placed in the position of the intermediate image between the first optical system and the second optical system. The optical member causes the light emitted from the first optical system to be resolved by the action of diffraction into a plurality of diffraction rays that fall on the display surface at angles of incidence different from each other.

Laser light emitted from the laser light source of the aforementioned lighting device has high coherence, and has extremely high light intensity. Therefore, when exposed to the laser light, a human eye may be harmed.

In the lighting device described in Patent Literature 1 named above, light from the second optical system falls on the display surface, such as a screen, in a discretely-diffused state. In general, if a beam spot on a plane orthogonal to the optical axis of the light from the second optical system is large, effects on a human eye can be softened. However, high-intensity light discretely exists within the beam spot of light from the second optical system. Therefore, the lighting device disclosed in Japanese Patent No. 4290095 cannot be said to be sufficient in safety.

The foregoing has described a conventional problem by illustrating a lighting device including a laser light source. This problem can arise in a lighting device including a light source that emits coherent light.

DISCLOSURE OF INVENTION

In view of the foregoing problem, the present disclosure has as an object to improve the safety of a lighting device including a light source that emits coherent light.

In an aspect of the present disclosure, there is provided a lighting device including a light source that emits coherent light, a scanner that causes the coherent light emitted from the light source to move, a first optical system that causes the coherent light from the scanner to be diffusely irradiated with a first spread angle, a first optical member that causes the coherent light from the first optical system to be diffusely irradiated with a second spread angle, and a second optical system that causes the coherent light from the first optical member to be irradiated toward a lighting zone. The second spread angle is larger than the first spread angle. A light intensity in a plane orthogonal to an optical axis of the coherent light irradiated on the lighting zone is substantially uniform.

A beam spot of the coherent light irradiated on the lighting zone may have a substantially oval shape whose major axis has a size larger than 7 mm. The first optical member may be provided at a back focal position of the first optical system and a front focal position of the second optical system. A light intensity at a center within a plane of the beam spot of the coherent light orthogonal to an optical axis of the coherent light irradiated from the first optical member onto the second optical system may be lower than a light intensity at an outer peripheral edge in the plane of the beam spot.

The scanner may cause the coherent light to move at 15 Hz or higher, and in this case, the scanner may cause the coherent light to move along a shape of a predetermined design.

The lighting device may further include a second optical member on which the coherent light from the second optical system is irradiated. The second optical system may emit substantially parallel rays. A beam spot of the coherent light irradiated on the second optical member may have a substantially oval shape whose major axis has a size larger than 7 mm.

The lighting device may include a plurality of the light sources that are capable of emitting plural rays of the coherent light whose wavelengths are different from each other and a plurality of the second optical members that correspond separately to each of the plural rays of coherent light. The lighting device may include a plurality of the light sources that are capable of emitting plural rays of the coherent light whose wavelengths are different from each other, and the scanner may cause the coherent light to move across a scanning area of a size corresponding to any of the wavelengths of the plural rays of coherent light.

A lighting device according to the present disclosure includes:
  a light source that emits coherent light;
  a scanner that causes the coherent light emitted from the light source to move;
  a first optical system that regulates an optical path of the coherent light from the scanner;
  a first optical member that causes the coherent light from the first optical system to diffuse; and
  a second optical system that regulates an optical path of the coherent light from the first optical member,
  wherein
  a lighting zone on a plane of projection is illuminated with the coherent light from the second optical system, and an irradiance [W/m2] in a plane orthogonal to an optical axis of the coherent light irradiated on the lighting zone is non-discrete.

In the lighting device according to the present disclosure, a position of incidence of the coherent light on the plane of projection may change according to an optical path of the coherent light as determined by the scanner.

In the lighting device according to the present disclosure, an angle of incidence of the coherent light onto the first optical system, a position of incidence of the coherent light onto the first optical system, a position of incidence of the coherent light onto the first optical member, a direction of emission of the coherent light from the second optical system, and the position of incidence of the coherent light on the plane of projection may change according to the optical path of the coherent light as determined by the scanner.

In the lighting device according to the present disclosure, the direction of emission of the coherent light from the second optical system may change according to the position of incidence of the coherent light onto the first optical member.

In the lighting device according to the present disclosure, the position of incidence of the coherent light onto the first optical member may change according to the optical path of the coherent light as determined by the scanner.

In the lighting device according to the present disclosure, a beam spot of the coherent light irradiated on the lighting zone may have a maximum width greater than 7 mm.

In the lighting device according to the present disclosure, the first optical member may be provided at a back focal position of the first optical system and a front focal position of the second optical system.

In the lighting device according to the present disclosure, an irradiance [W/m2] at a center within a beam spot of the coherent light irradiated from the first optical member onto the second optical system may be lower than an irradiance [W/m2] at an outer peripheral edge within the beam spot.

In the lighting device according to the present disclosure, the second optical system may concentrate the coherent light from the first optical member onto the plane of projection.

The lighting device according to the present disclosure may further include a second optical member that directs the coherent light from the second optical system toward the lighting zone on the plane of projection.

In the lighting device according to the present disclosure, a beam spot of the coherent light irradiated on the second optical member may have a maximum width greater than 7 mm.

In the lighting device according to the present disclosure, the second optical member may concentrate the coherent light from the second optical system onto the plane of projection.

In the lighting device according to the present disclosure, the scanner may cause the coherent light to move at a scanning frequency higher than or equal to 15 [Hz].

In the lighting device according to the present disclosure, the scanner may cause the coherent light to move along a predetermined pattern.

In the lighting device according to the present disclosure, a direction of emission of the coherent light from the second optical system may change according to an optical path determined by the scanner, and by causing the coherent light to move, the scanner may cause a position of incidence of the coherent light to move within the lighting zone visually identified as a predetermined pattern.

In the lighting device according to the present disclosure, a direction of emission of the coherent light from the second optical member may change according to an optical path determined by the scanner, and by causing the coherent light to move, the scanner may cause a position of incidence of the coherent light to move within the lighting zone visually identified as a predetermined pattern.

In the lighting device according to the present disclosure, the position of incidence of the coherent light may be caused to move over the plane of projection so that the predetermined pattern visually identified moves over the plane of projection.

In the lighting device according to the present disclosure, the second optical member may cause the coherent light from the second optical system to diffuse, and the coherent light may be spread and projected onto the lighting zone having a predetermined pattern on the plane of projection.

In the lighting device according to the present disclosure, a direction of emission of the coherent light from the second optical member may change according to an optical path determined by the scanner, and by causing the coherent light to move, the scanner may cause the predetermined pattern visually identified to move over the plane of projection.

In the lighting device according to the present disclosure, the scanner may cause the coherent light to move at a scanning frequency lower than 15 [Hz].

In the lighting device according to the present disclosure, a direction of emission of the coherent light from the second optical member may change according to a direction of incidence of the coherent light from the second optical system onto the second optical member, the direction of incidence of the coherent light from the second optical system onto the second optical member may change according to an optical path determined by the scanner, and the direction of incidence of the coherent light from the second optical system onto the second optical member may change at 800 [°/s] or lower.

In the lighting device according to the present disclosure, a speed of movement of the lighting zone over the plane of projection may be lower than or equal to 140 mm/s.

In the lighting device according to the present disclosure, a direction of emission of the coherent light from the second optical member may change according to an optical path determined by the scanner, and the scanner may cause the coherent light to move so that a plurality of the predetermined patterns are visually identified on the plane of projection.

In the lighting device according to the present disclosure, the scanner may cause the coherent light to move at a scanning frequency higher than or equal to 15 [Hz].

In the lighting device according to the present disclosure, the light source may intermittently emit the coherent light.

In the lighting device according to the present disclosure, a direction of emission of the coherent light from the second optical member may change according to a direction of incidence of the coherent light from the second optical system onto the second optical member, the direction of incidence of the coherent light from the second optical system onto the second optical member may change according to an optical path determined by the scanner, and the direction of incidence of the coherent light from the second optical system onto the second optical member may change at higher than 800 [°/s].

In the lighting device according to the present disclosure, a distribution of irradiance along a certain direction within a region where the coherent light passes over a plane orthogonal to an optical axis of the coherent light traveling from the lighting device toward the lighting zone may not include a local minimum value of irradiance within a range between two half-value positions, located on both sides of a maximum position at which a maximum irradiance is obtained, at each of which an irradiance half as high as the maximum irradiance is obtained, or a local minimum value of irradiance may exist within the range and a proportion of a difference between a smaller local maximum value of local maximum values of irradiance obtained at two local maximum-value positions located on both sides of a local minimum-value position at which the local minimum value is obtained and the local minimum value relative to the smaller local maximum value may be lower than or equal to 20 [%].

In the lighting device according to the present disclosure, a distribution of irradiance along a certain direction within a region where the coherent light passes over a plane orthogonal to an optical axis of the coherent light traveling from the lighting device toward the lighting zone may have an irradiance higher than or equal to 80 [%] of a maximum irradiance in 70 [%] or more of a range between two half-value positions, located on both sides of a maximum position at which a maximum irradiance is obtained, at each of which an irradiance half as high as the maximum irradiance is obtained.

In the lighting device according to the present disclosure, the light source may include a plurality of light sources that emit rays of coherent light whose wavelengths are different from each other, and the second optical member may include a plurality of second optical members that correspond separately to each of the rays of coherent light from the plurality of light sources.

In the lighting device according to the present disclosure, the light source may include a plurality of light sources that emit rays of coherent light whose wavelengths are different from each other, and a size of a scanning region on the first optical member on which the coherent light comes to fall may vary among the rays of coherent light from the plurality of light sources.

In the lighting device according to the present disclosure, a scanning region of a first ray of coherent light of a first wavelength band may be smaller than a scanning region of a second ray of coherent light of a second wavelength band that is shorter than the first wavelength band.

In the lighting device according to the present disclosure, a scanning region of a first ray of coherent light of a first wavelength band may be contained in a scanning region of a second ray of coherent light of a second wavelength band that is shorter than the first wavelength band.

In the lighting device according to the present disclosure, the light source may include a plurality of light sources that emit rays of coherent light whose wavelengths are different from each other, and an irradiance [W/m2] at a center within a region where the coherent light emitted from each of the light sources passes over a plane orthogonal to an optical axis of the coherent light may be lower than an irradiance [W/m2] at an outer peripheral edge within the region.

A lighting method according to the present disclosure includes the steps of:
preparing a lighting device including a light source that emits coherent light, a scanner that causes the coherent light emitted from the light source to move, a first optical system that regulates an optical path of the coherent light from the scanner, a first optical member that causes the coherent light from the first optical system to diffuse, and a second optical system that regulates an optical path of the coherent light from the first optical member; and
illuminating a lighting zone on a plane of projection with the coherent light from the second optical system,
wherein in the illuminating step, by changing an optical path of the coherent light using the scanner, a direction of emission of the coherent light from the second optical member is changed and a position of incidence of the coherent light is caused to move over the plane of projection.

In the lighting method according to the present disclosure, a position of incidence of the coherent light may be caused to move within the lighting zone, and the lighting zone may be illuminated so as to be visually identified as a predetermined pattern.

In the lighting method according to the present disclosure, the position of incidence of the coherent light may be caused to move over the plane of projection so that the predetermined pattern visually identified moves over the plane of projection.

In the lighting method according to the present disclosure, the lighting device may further include a second optical member that causes the coherent light from the second optical system to diffuse and spreads the coherent light onto the lighting zone having a predetermined pattern on the plane of projection, and in the illuminating step, by changing an optical path of the coherent light using the scanner, the predetermined pattern visually identified may be caused to move over the plane of projection.

In the lighting method according to the present disclosure, the lighting device may further include a second optical member that causes the coherent light from the second optical system to diffuse and spreads the coherent light onto the lighting zone having a predetermined pattern on the plane of projection, and the scanner may cause the coherent light to move so that a plurality of the predetermined patterns are visually identified on the plane of projection.

The present disclosure makes it possible to improve the safety of a lighting device including a light source that emits coherent light.

DESCRIPTION OF EMBODIMENTS

Embodiments of the present disclosure are described with reference to the drawings. In the accompanying drawings, the shape, scale, horizontal to vertical dimensional ratio, or other features of each component may be different from actual ones or exaggerated for ease of comprehension.

A numerical range expressed herein by using the preposition "to" means a range in which a numerical value placed before "to" and a numerical value placed after "to" are encompassed as a lower limit and an upper limit, respectively. Terms such as "film", "sheet", and "plate" used herein are not distinguished from one another on the basis of the difference in designation. For example, the "plate" is a concept that also encompasses a member that may be generally called "sheet" or "film".

Shapes and geometric conditions used herein, terms, such as "parallel", "orthogonal", and "identical", that specify the extents of the shapes and the geometric conditions, and values, such as lengths and angles, that specify the extents of the shapes and the geometric conditions are not bound by the strict sense but are construed with the inclusion of a range of extents to which similar functions may be expected.

Figure 1:
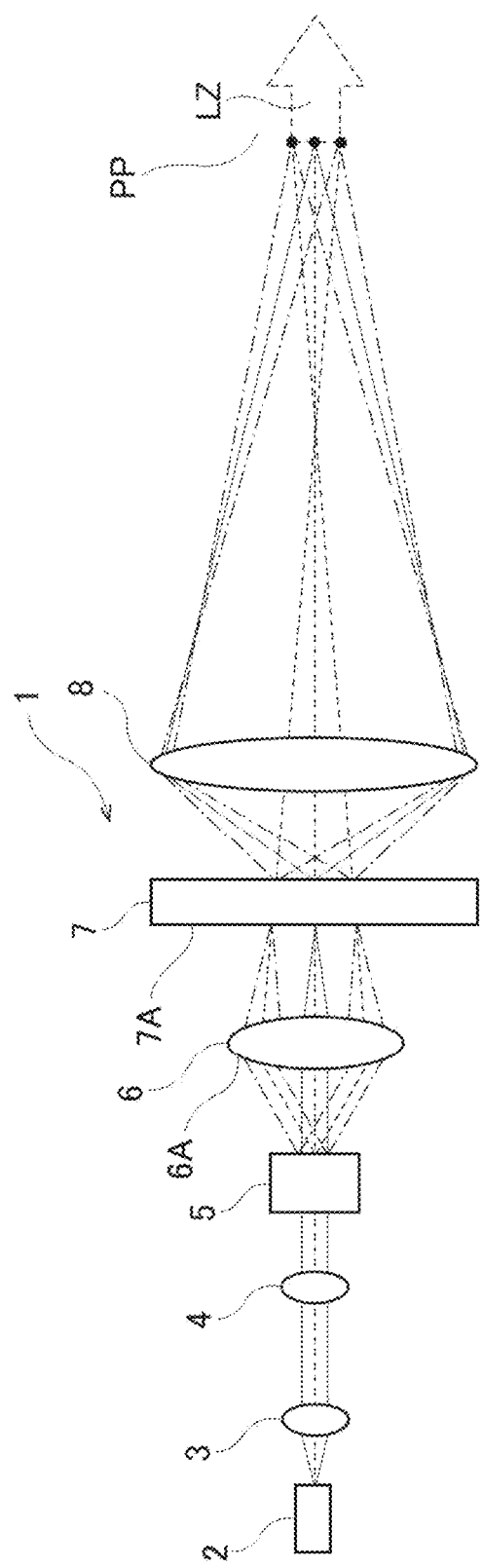
FIG. 1 is a schematic configuration diagram for explaining a lighting device according to a first embodiment of the present disclosure.
Figure 2:
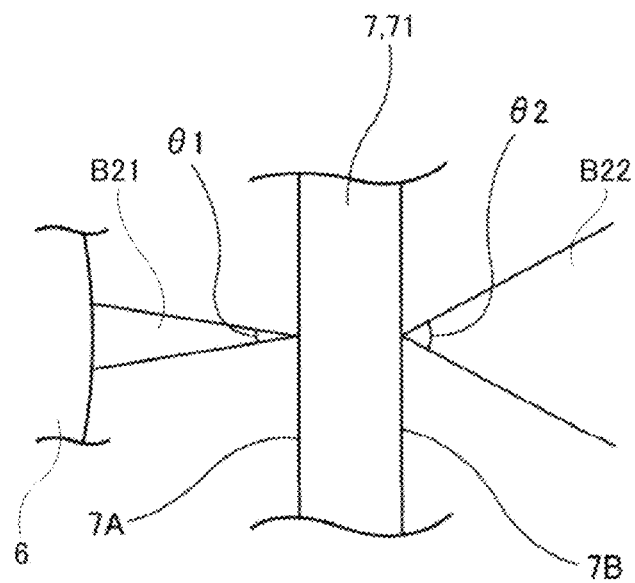
FIG. 2 is a partially-enlarged view schematically showing a configuration of a first optical member and nearby components of the lighting device.
Figure 3:
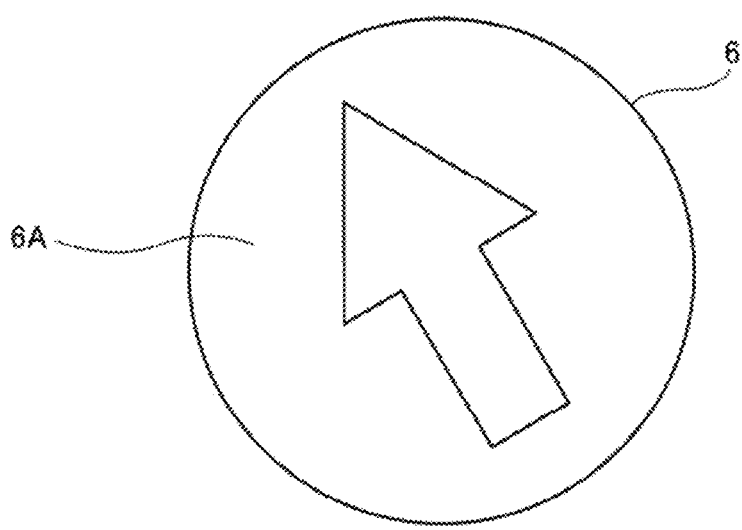
FIG. 3 is an explanatory diagram of an aspect that causes coherent light to move in a pattern shape across a plane of incidence of a first projection optical system.
Figure 4:
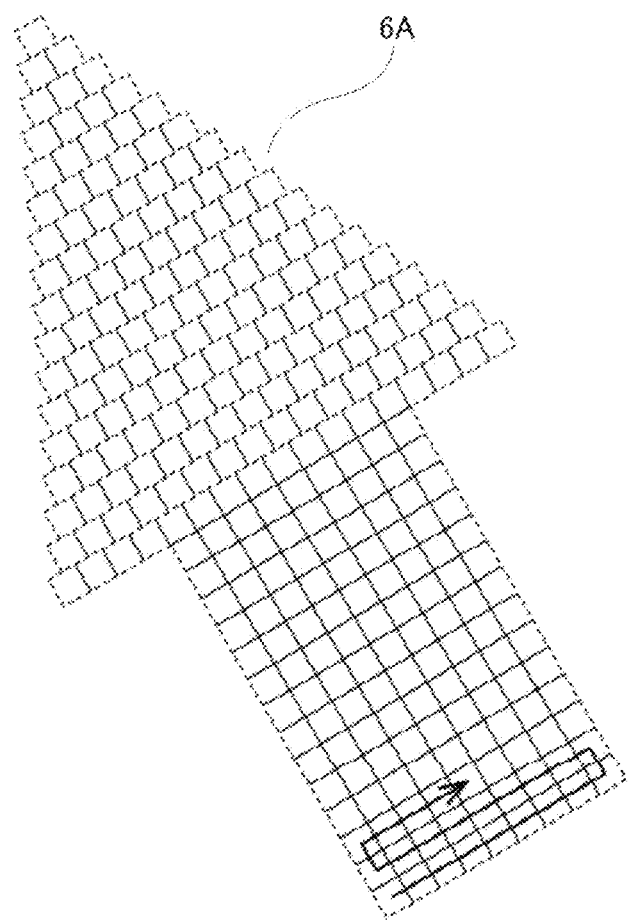
FIG. 4 is an explanatory diagram of a method for causing the coherent light to move in the pattern shape across the plane of incidence of the first projection optical system.

A lighting device according to a first embodiment is described. FIG. 1 is a schematic configuration diagram showing the lighting device according to the first embodiment. FIG. 2 is a partially-enlarged view schematically showing a configuration of a first optical member and nearby components in the first embodiment. FIG. 3 is an explanatory diagram of an aspect that causes coherent light to move in a pattern shape across a plane of incidence of a first projection optical system in the first embodiment. FIG. 4 is an explanatory diagram of a method for causing the coherent light to move in the pattern shape across the plane of incidence of the first projection optical system in the first embodiment. FIG. 5 illustrates profiles each showing the light intensity within a beam spot of a beam irradiated from a second projection optical system onto a lighting zone LZ in the first embodiment.

The lighting device 1 according to the first embodiment illuminates a lighting zone LZ on a plane of projection PP with coherent light. As shown in FIG. 1, the lighting device 1 includes a light source 2, a condensing optical system 3, a collimating optical system 4, a scanner 5, a first projection optical system 6, a first optical member 7, and a second projection optical system 8. The plane of projection PP and the lighting zone LZ may be appropriately set depending on the intended use of the lighting device 1. For example, in a case where the lighting device 1 is mounted on a movable body such as a vehicle or a drone, the plane of projection PP and the lighting zone LZ may for example be a road surface. In a case where the lighting device 1 is installed as a stationary type, the plane of projection PP and the lighting zone LZ may for example be an exterior wall of a building, the interior part, such as a ceiling, a wall, or a floor, of a building, or a natural object such as a cliff or a waterfall. In a case where the lighting device 1 is carried and moved for use as a portable type, the plane of projection PP and the lighting zone LZ may be appropriately selected by a user.

The light source 2 emits coherent light. The light source 2 is typically a laser light source that emits laser light. The laser light source is not limited to a particular type but may be of any of various types such as a semiconductor laser.

In the illustrated example, a bundle of light emitted from the light source 2 is made by the condensing optical system 3 to become an expanded beam. This expanded beam is collimated by the collimating optical system 4. The beam collimated by the collimating optical system 4 enters the scanner 5. The beam having entered the scanner 5 has its traveling direction changed into a predetermined two-dimensional direction. For simplicity of illustration, FIG. 1 is illustrated such that the beam passes through the scanner 5. However, for example, the scanner 5 may have a reflecting mirror that reflects the beam. The direction of reflection of the beam may be periodically changed by rotating the reflecting mirror around the axis of rotation. Usable examples of the reflecting mirror include a MEMS (microelectromechanical systems) mirror or other mirrors.

There are no particular limitations on the scanning frequency at which the scanner 5 causes the beam to move. For example, the scanner 5 scans a plane of incidence 6A of the first projection optical system 6 with the beam. That is, the scanner 5 causes the position of incidence of the beam onto the plane of incidence 6A to move over the plane of incidence 6A. The scanner 5 can cause the beam to move at high speeds within a scanning region of a predetermined pattern on the plane of incidence 6A of the first projection optical system 6. By thus causing the beam to move at high speeds over the plane of incidence 6A of the first projection optical system 6, an observer is allowed to visually identify an afterimage of the coherent light. That is, while the coherent light falls on each position within the scanning region at time intervals, the coherent light is perceived by the observer as continuously falling on each position within the scanning region, as the time intervals are shorter than resolution of vision. This allows the observer to recognize the pattern of the scanning region.

For example, in the example shown in FIG. 3, the scanner causes the beam to move at high speeds within an arrow-shaped scanning region on the plane of incidence 6A of the first projection optical system 6. An observer visually identifies light as being irradiated in an arrow pattern on the first projection optical system 6. The observer can recognize this pattern as being displayed on the first projection optical system 6. More specifically, as shown in FIG. 4, a plurality of regions into which a region of a two-dimensional shape (such as an arrow) is divided are set on the plane of incidence 6A of the first projection optical system 6. Each of the regions can be a rectangular region about the same size as a beam spot (i.e. a region on which the beam falls at a certain moment) of the beam. Then, as indicated by a solid arrow in FIG. 4, the beam is caused to move in such a way as to illuminate the regions in sequence. This allows the observer to visually recognize an arrow design as being displayed on the plane of incidence 6A of the first projection optical system 6.

The pattern is not limited to an arrow, and possible examples of the pattern include a letter, a picture, a color pattern, a symbol, a mark, a character, a pictogram, or other patterns.

In causing an observer to recognize a scanning region as a pattern on the first projection optical system 6, the scanning frequency at which the scanner 5 causes the beam to move is set so that the observer can observe an afterimage of the coherent light within the scanning region. This scanning frequency is preferably, for example, higher than or equal to 15 Hz, more preferably higher than or equal to 50 Hz.

The lighting device 1 according to the first embodiment can also cause a scanning region of a predetermined pattern (e.g. a scanning region of a two-dimensional shape such as an arrow) to move over the plane of incidence 6A of the first projection optical system 6. That is, while the beam is caused to move at high speeds (e.g. at a scanning frequency higher than or equal to 15 Hz) within a scanning region of a predetermined pattern, the scanning region may be caused to move over the plane of incidence 6A. In this case, a lighting pattern on the plane of incidence 6A that is visually identified as the shape of the scanning region moves. A pattern displayed on the first projection optical system 6 needs only move at such a speed as to be able to be visually recognized by an observer. For example, the speed of movement of the scanning region over the first projection optical system 6 can be lower than or equal to 140 mm/s.

The first projection optical system 6 regulates the optical path of the coherent light from the scanner 5. As shown in FIG. 1, the first projection optical system 6 has a function of concentrating the coherent light. As shown in FIG. 2, the first projection optical system 6 concentrates the beam from the scanner 5 onto a plane of incidence 7A of the first optical member 7 with a first spread angle $\theta 1$. Possible examples of the first projection optical system 6 include a lens or other components. The position of incidence of the beam on the first projection optical system 6 changes depending on how the scanner 5 causes the beam to move. That is, the scanner 5 can cause the beam to move to such an extent that the beam can fall on the plane of incidence 6A of a lens constituting the first projection optical system 6.

As shown in FIG. 2, the first spread angle $\theta 1$ is the converging angle of a beam B21 that falls on the plane of incidence 7A of the first optical member 7. The first spread angle $\theta 1$ shown in FIG. 2 is specified as a maximum that this converging angle can reach. Accordingly, in a case where the shape of a beam spot of a beam traveling from the first projection optical system 6 toward the first optical member 7 is a circle, the first spread angle $\theta 1$ may be defined as an angle as seen along a direction orthogonal to the optical path (optical axis) of the beam. In a case where the shape of the beam is an oval, the first spread angle $\theta 1$ may be defined as an angle as seen from a direction orthogonal to both of the optical path (optical axis) of the beam and the major axis of the oval.

The first spread angle $\theta 1$ may be calculated from measurements of the width (diameter) of a beam spot of a beam as taken by a beam profiler at at least two points on an optical path from the first projection optical system 6 toward the first optical member 7 and the distance between the two points of measurement. A usable example of the beam profiler is an Ophir manufactured by Japan Laser Corporation. The width (diameter) of a beam spot may be specified as a range of 1/e of the maximum light intensity within the beam spot.

The first optical member 7 causes the coherent light from the first projection optical system 6 to diffuse. As shown in FIG. 2, the first optical member 7 causes the beam irradiated from the first projection optical system 6 with the first spread angle $\theta 1$ to diffuse into diffused light with a second spread angle $\theta 2$ that is larger than the first spread angle $\theta 1$. Light B22 traveling out of the first optical member 7 travels toward the second projection optical system 8. The first optical member 7 is constituted, for example, by a diffractive optical element (DOE) or other components. The diffractive optical element is an optical element that performs the action of diffraction on incident light. The diffractive optical element may include, for example, a holographic optical element (HOE). The first optical member 7 may be constituted by other components such as a microlens array, a lenticular lens, and a diffuser. Alternatively, the first optical member 7 may be constituted by a diffractive optical element having incorporated therein the functions of a microlens array, a lenticular lens, or other components.

The second spread angle $\theta 2$ may be appropriately set to such an extent that even if an observer looks directly at a beam irradiated from the second projection optical system 8 toward the lighting zone LZ, the eyes of the observer are not exposed to all bundles of light of a diffused beam. As shown in FIG. 2, the second spread angle $\theta 2$ is a diffusion angle of a beam that is diffusedly irradiated from a plane of emission 7B of the first optical member 7 toward the second projection optical system 8. The second spread angle $\theta 2$ shown in FIG. 2 is specified as a maximum that this diffusion angle can reach. In a case where the shape of a beam spot of a beam traveling from the first optical member 7 toward the second projection optical system 8 is a circle, the second spread angle $\theta 2$ may be defined as an angle as seen along a direction orthogonal to the optical path (optical axis) of the beam. In a case where the shape of the beam is an oval, the second spread angle $\theta 2$ may be defined as an angle as seen from a direction orthogonal to both of the optical path (optical axis) of the beam and the major axis of the oval.

The second spread angle $\theta 2$ may be calculated from measurements of the width (diameter) of a beam spot of a beam as taken by a beam profiler at at least two points on an optical path from the plane of emission 7B of the first optical member 7 toward the second projection optical system 8 and the distance between the two points of measurement. A usable example of the beam profiler is an Ophir manufactured by Japan Laser Corporation. The width (diameter) of a beam spot may be specified as a range of 1/e of the maximum light intensity within the beam spot.

The first optical member 7 may be placed on a back focal position of the first projection optical system 6. This placement allows parallel beams incident on the first projection optical system 6 to converge on the first optical member 7. The first optical member 7 may be placed on a front focal position of the second projection optical system 8. This placement allows diverging beams diverging from the first optical member 7 to be collimated by the second projection optical system 8. Such placement of the first optical member 7 allows an incident beam concentrated with the first spread angle θ1 to be emitted with the second spread angle θ2.

The first optical member 7 causes a beam irradiated from the first optical member 7 onto the second projection optical system 8 to diffuse so that a non-discrete irradiance [W/m2] is attained on a plane orthogonal to the optical axis of the beam. The term "non-discrete" here means that a beam diffused by the first optical member 7 at a given moment does not split up into a plurality of beams that travel. In other words, the term means that a beam diffused by the first optical member 7 travels into one continuous angular range.

Figure 5A:
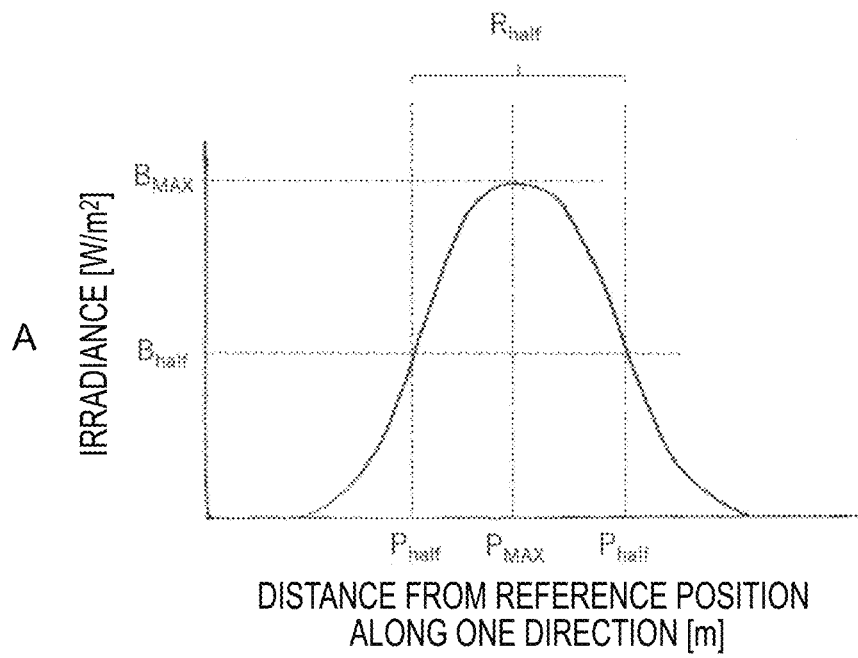
FIG. 5A is a graph showing an example of a distribution of irradiance within a beam spot.
Figure 5B:
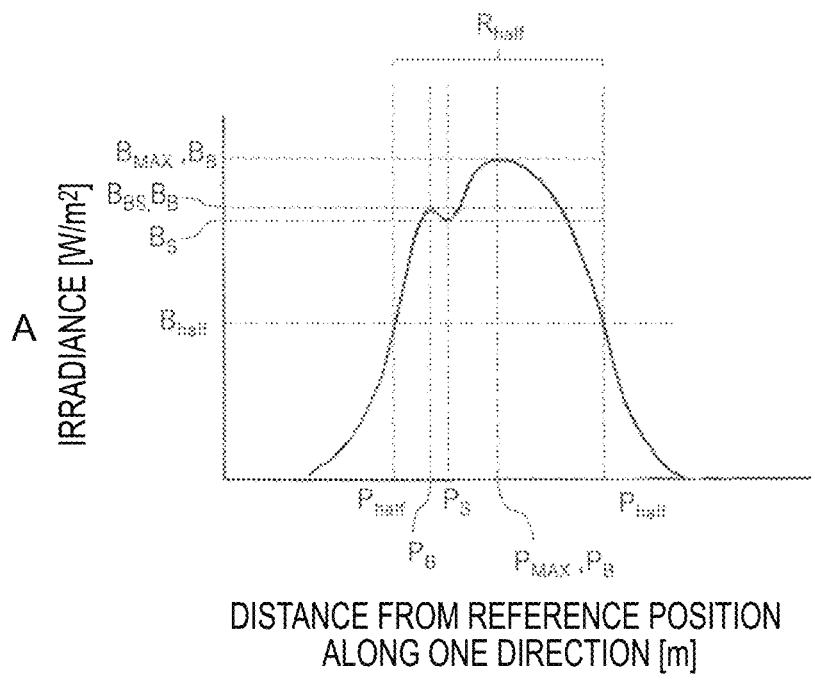
FIG. 5B is a graph showing another example of a distribution of irradiance within a beam spot.
Figure 5C:
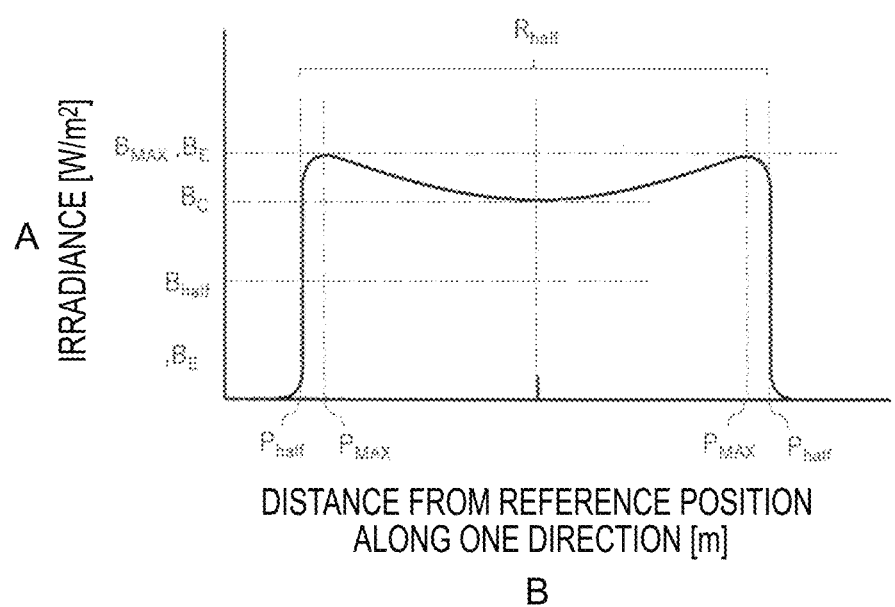
FIG. 5C is a graph showing still another example of a distribution of irradiance within a beam spot.

FIGS. 5A to 5C show examples of non-discrete distributions of irradiance [W/m2]. FIGS. 5A to 5C show distributions of irradiance [W/m2] as measured within a region where coherent light passes over a plane located 10 cm away from the first optical member 7 and orthogonal to the optical axis of a beam from the first optical member 7. Each of these distributions is a distribution of irradiance [W/m2] at positions arranged in one direction on the plane. The vertical axes of the illustrated graphs and a graph shown in FIG. 10, which will be described later, represent irradiance [W/m2]. The horizontal axes represent distance from a reference position along one direction. The reference position can for example be a position at which the irradiance [W/m2] is 0. The irradiance can be measured with a PowerMax manufactured by Coherent, Inc.

The non-discrete distribution of irradiance shown in FIG. 5A does not include a local minimum value of irradiance within a range (full width at half maximum) $R_{half}$. The range $R_{half}$ is a range between two half-value positions $P_{half}$. The two half-value positions are located on both sides of a maximum position $P_{MAX}$. At the maximum position $P_{MAX}$ a maximum irradiance $B_{MAX}$ is obtained. At each of the two half-value positions an irradiance $B_{half}$ half as high as the maximum irradiance $B_{MAX}$ is obtained. The non-discrete distribution of irradiance shown in FIG. 5B includes a local minimum value within the range $R_{half}$. However, the proportion $((B_{BS}-B_S)/B_{BS})$ of the difference $(B_{BS}-B_S)$ between a smaller local maximum value $B_{BS}$ and the local minimum value $B_S$ relative to the smaller local maximum value $B_{BS}$ is lower than or equal to 50 [%], more preferably lower than or equal to 40 [%], even more preferably lower than or equal to 30 [%]. The smaller local maximum value $B_{BS}$ is a smaller one of local maximum values $B_B$ of irradiance. The local maximum values $B_B$ are obtained at two local maximum-value positions $P_B$ on the distribution of irradiance. The two local maximum-value positions $P_B$ are located on both sides of a local minimum-value position $P_S$ on the distribution of irradiance. At the local minimum-value position $P_S$ a local minimum value $B_S$ is obtained. Furthermore, in the example shown in FIG. 5C, an irradiance higher than or equal to 50 [%], more preferably higher than or equal to 60 [%], even more preferably higher than or equal to 70 [%], of the maximum irradiance is attained in 50 [%] or more of the range $R_{half}$ between the two half-value positions $P_{half}$. In particular, the distribution of irradiance shown in FIG. 5C is substantially uniform in irradiance within the range $R_{half}$.

In the first embodiment, the beam from the first optical member 7 diffuses with the second spread angle θ2 and is irradiated toward the second projection optical system 8. However, partial existence of high-intensity light (hot spot) within a beam spot is unfavorable for laser safety. Improvement in laser safety can be brought about by diffusing the coherent light so that a non-discrete irradiance [W/m2] is attained.

Further, it is anticipated that a beam of zero-order diffracted light in an unadjusted distribution of light intensity within a beam spot will drop out of the first optical member 7. In this respect, the non-discrete irradiance distribution shown in FIG. 5C is substantially uniform in irradiance. Accordingly, improvement in laser safety can be brought about even if zero-order diffracted light is generated at the first optical member 7.

In particular, in the distribution of irradiance shown in FIG. 5C, an irradiance BC [W/m2] at the center within a beam spot of coherent light on a plane orthogonal to the optical axis of the coherent light, which is irradiated from the first optical member 7 onto the second projection optical system 8, is lower than an irradiance BE [W/m2] at an outer peripheral edge within the beam spot. Normally, the optical path of light traveling through the center within a beam spot is the optical path of zero-order light. Accordingly, sufficient improvement in laser safety can be brought about even if zero-order diffracted light is generated at the first optical member 7.

The second projection optical system 8 regulates the optical path of the coherent light from the first optical member 7. As shown in FIG. 1, the second projection optical system 8 has a function of irradiating, toward the lighting zone LZ, a beam diffusedly irradiated from the first optical member 7 with the second spread angle θ2. The second projection optical system 8 shown in FIG. 1 concentrates the coherent light from the first optical member 7 onto the plane of projection PP. For example, the second projection optical system 8 concentrates the coherent light to a distance of several meters to several tens of meters from the lighting device 1. Accordingly, the width or diameter of a beam spot on a plane orthogonal to the optical axis of the coherent light traveling out of the second projection optical system 8 becomes smaller toward the plane of projection PP. Possible examples of the second projection optical system 8 include a lens or other components.

There are no particular limitations on the shape of a beam spot of a beam that is irradiated from the second projection optical system 8 toward the lighting zone LZ. The beam spot here refers to a region where coherent light traveling toward the lighting zone LZ passes over a plane orthogonal to the optical axis of the coherent light. The shape of a spot of a beam traveling toward the lighting zone LZ may for example be a circular shape or an oval shape. The diameter of the pupil of a human eye is normally approximately 2.5 mm to 4 mm. The diameter of a pupil dilated by disease or other factors (mydriasis) is said to be approximately 6 mm to 7 mm. Accordingly, from the standpoint of laser safety, the maximum width of a spot of a beam traveling toward the lighting zone LZ is preferably greater than 7 mm, more preferably greater than or equal to 10 mm, even more preferably greater than or equal to 15 mm. Further, as will be mentioned later, the maximum width of a beam spot can be narrower than or equal to 30 mm. In the case of a circular beam spot, the diameter of the beam spot can be of the aforementioned size. Further, in the case of an oval beam spot, the length of the beam spot along the major axis can be of the aforementioned size.

The following describes a method for illuminating the lighting zone LZ on the plane of projection PP with the lighting device 1 described above.

In a case where this lighting device 1 is used, as shown in FIG. 1, the position of incidence of the coherent light on the plane of projection PP changes according to the optical path of the coherent light as determined by the scanner 5. More specifically, the position of incidence of the coherent light onto the first projection optical system 6 changes according to the optical path of the coherent light as determined by the scanner 5. Further, in the illustrated example, the angle of incidence of the coherent light onto the first projection optical system 6 changes according to the optical path of the coherent light as determined by the scanner 5. The position of incidence of the coherent light onto the first optical member 7 changes according to the position of incidence of the coherent light onto the first projection optical system 6. As a result, the position of incidence of the coherent light onto the first optical member 7 changes according to the optical path of the coherent light as determined by the scanner 5. In the illustrated example, the angle of incidence of the coherent light onto the first optical member 7 changes too according to the position of incidence of the coherent light onto the first projection optical system 6. Next, the direction of emission of the coherent light from the second projection optical system 8 changes according to the position of incidence of the coherent light onto the first optical member 7. The position of incidence of the coherent light on the plane of projection PP changes according to the direction of emission of the coherent light from the second projection optical system 8. That is, this lighting device 1 makes it possible to, by changing the optical path of the coherent light through the use of the scanner 5, change the direction of emission of the coherent light from the second projection optical system 8 and cause the position of incidence of the coherent light to move over the plane of projection PP.

Accordingly, by causing the coherent light to move at high speeds over the first optical member 7, the scanner 5 can cause the position of incidence of the coherent light on the plane of projection PP to move at high speeds. Assume, for example, that as shown in FIG. 1, a lighting zone LZ having an arrow pattern is set on the plane of projection PP. In this example, high-speed movement of the position of incidence of the coherent light within the lighting zone LZ allows an observer to visually identify the coherent light through an afterimage as being irradiated all over the lighting zone LZ. That is, the observer perceives the pattern of the lighting zone LZ as being displayed on the plane of projection PP. From this standpoint, it is preferable that the scanning frequency at which the scanner 5 causes the coherent light to move be higher than or equal to resolution of human vision. Specifically, the scanning frequency of the coherent light can be higher than or equal to 15 Hz, more preferably higher than or equal to 50 Hz.

By thus controlling the scanning of the coherent light by the scanner 5, a desired lighting zone LZ can be set on the plane of projection PP, and this lighting zone LZ can be illuminated. For example, in the example shown in FIG. 1, the lighting zone LZ may be the contours of the arrow alone, or the lighting zone LZ may be the contours of the arrow and a region surrounded by the contours.

Figure 13A:
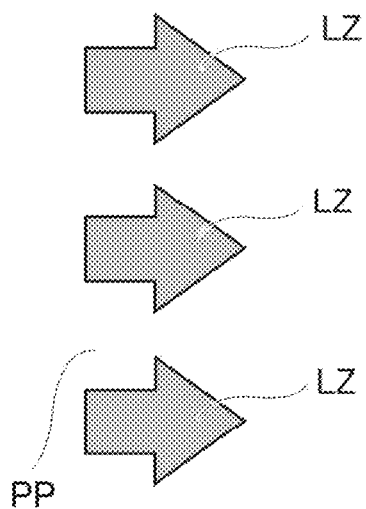
FIG. 13A is a plan view showing an example of a lighting zone on a plane of projection.

Further, as shown in FIG. 13A, a plurality of patterns can be displayed on the plane of projection PP. In the example shown in FIG. 13A, the lighting zone LZ is a region in which three thick arrows are displayed. In the illustrated example, the plurality of patterns are separate from one another.

Figure 13B:
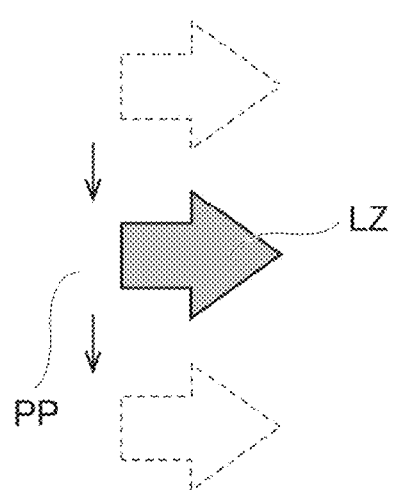
FIG. 13B is a plan view showing another example of a lighting zone on a plane of projection.
Figure 13C:
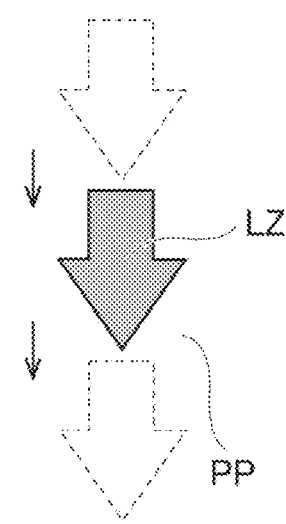
FIG. 13C is a plan view showing still another example of a lighting zone on a plane of projection.

Furthermore, as shown in FIGS. 13B and 13C, the lighting zone LZ may be caused to move over the plane of projection PP. In each of the examples shown in FIGS. 13B and 13C, by causing the position of incidence of the coherent light to move within the lighting zone LZ, the lighting zone LZ is illuminated so as to be visually identified as a predetermined pattern. In each of the examples shown in FIGS. 13B and 13C, furthermore, while the shape of a lighting zone LZ on the plane of projection PP is maintained, the lighting zone LZ is caused to move so that the predetermined pattern visually identified moves over the plane of projection PP. In the example shown in FIG. 13B, as indicated by thin arrows, a lighting zone LZ having a pattern indicating a direction moves in a direction that is not parallel with the direction indicated by the pattern. In particular, in the example shown in FIG. 13B, the lighting zone LZ moves in a direction orthogonal to the direction indicated by the pattern. In the example shown in FIG. 13C, as indicated by thin arrows, a lighting zone LZ having a pattern indicating a direction moves in the direction indicated by the pattern. In each of the examples shown in FIGS. 13B and 13C, the pattern displayed on the plane of projection PP needs only move at such a speed as to be able to be visually recognized by an observer. For example, the speed of movement of the lighting zone LZ over the plane of projection PP can be lower than or equal to 140 mm/s.

Incidentally, an irradiance [W/m2] in a plane orthogonal to the optical axis of coherent light irradiated on the lighting zone LZ by this lighting device 1 is non-discrete. This makes it possible to effectively improve the laser safety with which an observer looks at the lighting device 1 with his/her eyes.

The term "non-discrete" here has a meaning identical to the meaning already described about the coherent light traveling from the first optical member 7 toward the second projection optical system 8. That is, the term "non-discrete" here means that a beam emitted from the lighting device 1 at a given moment does not split up into a plurality of beams that travel. In other words, the term means that a beam emitted from the lighting device 1 travels into one continuous angular range.

FIGS. 5A to 5C, which have already been referred to, also show examples of the non-discrete irradiance [W/m2] of light that comes from the lighting device 1. FIGS. 5A to 5C show distributions of irradiance [W/m2] as measured within a region where coherent light passes over a plane located 10 cm away from the most downstream optical member of the lighting device 1, i.e. a plane of emission of the lighting device 1, and orthogonal to the optical axis of a beam from the lighting device 1. Each of these distributions is a distribution of irradiance [W/m2] at positions along one direction on the plane. The irradiance can be measured with a PowerMax manufactured by Coherent, Inc. The profiles of irradiance distribution shown in FIGS. 5A to 5C are as already described.

The aforementioned first optical member 7 diffuses incident light so that a non-discrete irradiance distribution is attained. The first optical member 7 shown in FIG. 1 has such a diffraction characteristic as to diffusedly transmit light while substantially maintaining the optical axis. A combination of such a first optical member 7 and the second projection optical system 8 makes it possible to attain a non-discrete distribution of irradiance [W/m2] of coherent light that comes from the lighting device 1 at a given moment. Further, adjusting the optical characteristics of the second projection optical system 8 too makes it possible to attain a non-discrete distribution of irradiance [W/m2] of coherent light that comes from the lighting device 1 at a given moment.

As mentioned above, from the standpoint of laser safety, the width of a beam spot of a beam traveling toward the plane of projection PP is preferably greater than 7 mm, more preferably greater than or equal to 10 mm, even more preferably greater than or equal to 15 mm. From the standpoint of illuminating the lighting zone LZ on the plane of projection PP with high definition, it is preferable that the width of a beam spot of a beam traveling toward the plane of projection PP not be too great. It is preferable that the width of a beam spot of a beam traveling toward the plane of projection PP be narrower than or equal to 30 mm.

Further, as described with reference to FIGS. 3 and 4, a scanning region may be rendered able to be visually identified on the first projection optical system 6. Moreover, by the characteristics of diffusion in the first optical member 7, e.g. the diffraction characteristics of a diffractive optical element constituting the first optical member 7, a pattern of a scanning region that is visually identified on the first projection optical system 6 and a pattern of a lighting zone LZ that is visually identified on the plane of projection PP can be given corresponding or associated shapes. More specifically, the scanning region on the first projection optical system 6 and the lighting zone LZ on the plane of projection PP can be given identical or similar shapes. Further, in each of the examples shown in FIGS. 13B and 13C, the pattern of the scanning region visually identified may be caused to move over the first projection optical system 6.

Further, according to the lighting device 1 according to the first embodiment, which has the aforementioned configuration, the first optical member 7 causes a beam irradiated from the first projection optical system 6 with the first spread angle θ1 to be diffusedly irradiated toward the second projection optical system 8 with the second spread angle θ2, which is larger than the first spread angle θ1. This makes it possible to more effectively improve the laser safety with which an observer looks directly at the lighting device 1.

Figure 14:
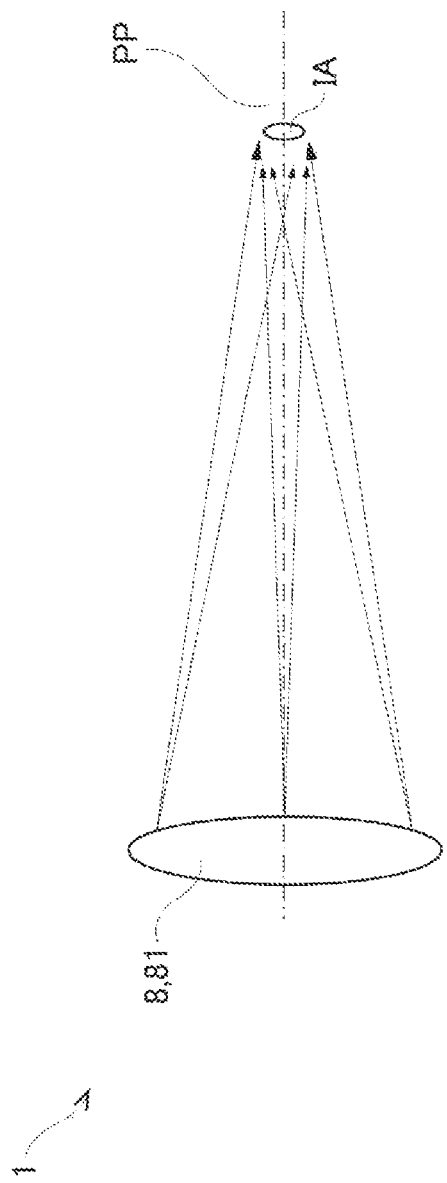
FIG. 14 is a diagram for explaining a modification of the second projection optical system.

In the aforementioned first embodiment, as shown in FIG. 14, the second projection optical system 8 may have diffusing power. By the second projection optical system 8 having comparatively low diffusing power, the size of a beam spot (incidence area IA) that falls on the plane of projection PP at a given moment can be increased. In the example shown in FIG. 14, the whole size of a beam spot of a beam that travels from the second projection optical system 8 toward the plane of projection PP becomes gradually smaller. However, coherent light emitted from each position on the second projection optical system 8 travels toward the plane of projection PP while spreading the size of its cross-sectional area by diffusing. It should be noted that FIG. 14 shows rays of coherent light emitted from several positions on the second projection optical system 8 at a certain moment.

Figure 6:
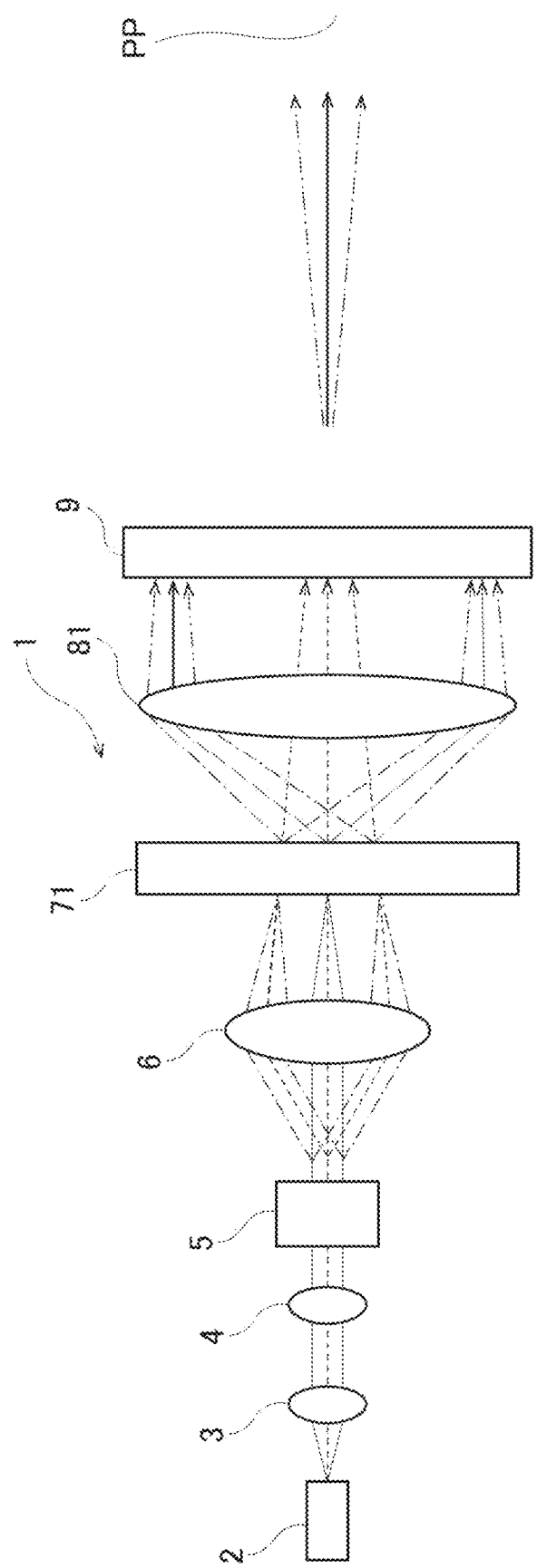
FIG. 6 is a schematic configuration diagram for explaining a lighting device according to a second embodiment of the present disclosure.

Next, a lighting device according to a second embodiment is described. FIG. 6 is a schematic configuration diagram showing the lighting device according to the second embodiment. Those components of the lighting device according to the second embodiment which are similar to those of the first embodiment are given identical reference signs, and a detailed description of such components is omitted.

The lighting device 1 according to the second embodiment illuminates a lighting zone LZ on a plane of projection PP with coherent light. As shown in FIG. 6, the lighting device 1 includes a light source 2, a condensing optical system 3, a collimating optical system 4, a scanner 5, a first projection optical system 6, a first optical member 71, a second projection optical system 81, and a second optical member 9.

The first optical member 71 causes the coherent light from the first projection optical system 6 to diffuse. The first optical member 71 may be identical in configuration to the first optical member 7 described in the first embodiment. For example, as shown in FIG. 2, the first optical member 71 causes a beam irradiated from the first projection optical system 6 with the first spread angle θ1 to diffuse with a second spread angle θ2 that is larger than the first spread angle θ1. The coherent light diffused by the first optical member 71 travels toward the second projection optical system 81. The first optical member 71 may be constituted, for example, by a diffractive optical element (DOE) or other components. The diffractive optical element is an optical element that performs the action of diffraction on incident light. The diffractive optical element may include, for example, a holographic optical element (HOE) or other components. The first optical member 71 may be constituted by other components such as a microlens array, a lenticular lens, and a diffuser. Alternatively, the first optical member 71 may be constituted by a diffractive optical element having incorporated therein the functions of a microlens array, a lenticular lens, or other components.

The second projection optical system 81 regulates the optical path of the coherent light from the first optical member 7. The second projection optical system 81 may be identical in configuration to the second projection optical system 8 described in the first embodiment. The second projection optical system 81 has a function of irradiating, toward the second optical member 9, a beam diffusedly irradiated from the first optical member 7 with the second spread angle θ2. Since the first optical member 71 is placed on a front focal position of the second projection optical system 81, the second projection optical system 81 functions as a collimator that causes beams from the first optical member 7 to travel parallel. Possible examples of the second projection optical system 81 include a Fresnel lens, a spherical lens, an aspherical lens, a matched lens, an Fθ lens, an anamorphic lens, or other components. Alternatively, the second projection optical system 81 may be a concave mirror, a curved mirror, or other components. In a case where the second projection optical system 81 is a concave mirror, the first optical member 7 may be placed on a focal position of the convex mirror serving as the second projection optical system 81. This placement causes beams reflected off the concave mirror to travel in directions substantially parallel to each other. It is preferable that the parallelism of parallel rays that are irradiated from the second projection optical system 81 toward the second optical member 9 for example be within a range of ±0.2°.

The second optical member 9 directs the coherent light from the second projection optical system 81 toward the lighting zone LZ on the plane of projection PP. The second optical member 9 illustrated has a function of irradiating, toward the lighting zone, beams irradiated as parallel rays from the second projection optical system 81. The second optical member 9 may be constituted, for example, by a diffractive optical element (DOE) or other components. The diffractive optical element is an optical element that performs the action of diffraction on incident light. The diffractive optical element may include, for example, a holographic optical element (HOE) or other components. The second optical member 9 may be constituted by other components such as a microlens array, a lenticular lens, and a diffuser. Alternatively, the second optical member 9 may be constituted by a diffractive optical element having incorporated therein the functions of a microlens array, a lenticular lens, or other components.

The irradiance distribution of coherent light that comes from the lighting device 1 via the second optical member 9 is adjusted in the same manner as in the case of the first embodiment. More specifically, in the lighting device 1 according to the second embodiment too, an irradiance

[W/m2] in a plane orthogonal to the optical axis of coherent light irradiated on the lighting zone LZ is non-discrete. This makes it possible to effectively improve the laser safety with which an observer looks at the lighting device 1 with his/her eyes.

The term "non-discrete" here has a meaning identical to the meaning already described in the first embodiment. That is, the term "non-discrete" here means that a beam emitted from the second optical member 9 and the lighting device 1 at a given moment does not split up into a plurality of beams that travel. In other words, the term means that a beam emitted from the second optical member 9 and the lighting device 1 travels into one continuous angular range.

FIGS. 5A to 5C, which have already been referred to, also show examples of the non-discrete irradiance [W/m2] of light that comes from the lighting device 1 according to the second embodiment. FIGS. 5A to 5C show distributions of irradiance [W/m2] as measured within a region where coherent light passes over a plane located 10 cm away from the most downstream optical member of the lighting device and orthogonal to the optical axis of a beam from the lighting device 1. Each of these distributions is a distribution of irradiance [W/m2] at positions arranged along one direction on the plane. The irradiance can be measured with a PowerMax manufactured by Coherent, Inc. The profiles of irradiance distribution shown in FIGS. 5A to 5C are as already described.

The irradiance distributions shown in FIGS. 5A to 5C may be achieved by appropriately regulating one or more of the diffraction characteristics of the first optical member 71 and the diffraction characteristics of the second optical member 9. For example, the first optical member 71 shown in FIG. 1 may have such a diffraction characteristic as to diffusedly transmit light while substantially maintaining the optical axis.

Further, it is preferable that an irradiance [W/m2] in a plane orthogonal to the optical axis of coherent light traveling from the second projection optical system 81 to the second optical member 9 be non-discrete too. In particular, it is preferable that the coherent light traveling from the second projection optical system 81 to the second optical member 9 be able to achieve the irradiance distribution shown in FIG. 5C. In the irradiance distribution shown in FIG. 5C, an irradiance BC [W/m2] at the center within a beam spot of coherent light on a plane orthogonal to the optical axis of the coherent light, which is irradiated from the second projection optical system 81 onto the second optical member 9, is lower than an irradiance BE [W/m2] at an outer peripheral edge within the beam spot. Accordingly, even if zero-order diffracted light is generated at the second optical member 9, the irradiance at the center can be effectively prevented from becoming too high. This can result in further improvement in laser safety.

The following describes a method for illuminating the lighting zone LZ on the plane of projection PP with the lighting device 1 according to the second embodiment described above.

As shown in FIG. 6, as in the case of the first embodiment, the direction of emission of the coherent light from the second projection optical system 81 changes according to the position of incidence of the coherent light onto the first optical member 71. Furthermore, as in the case of the first embodiment, the direction of emission of the coherent light from the second projection optical system 81 changes according to the optical path of the coherent light as determined by the scanner 5. Moreover, the direction of the coherent light from the second optical member 9 changes according to the direction of incidence of the coherent light from the second projection optical system 81 onto the second optical member 9. Accordingly, the direction of emission of the coherent light from the second optical member 9 changes according to the optical path of the coherent light as determined by the scanner 5.

Figure 15:
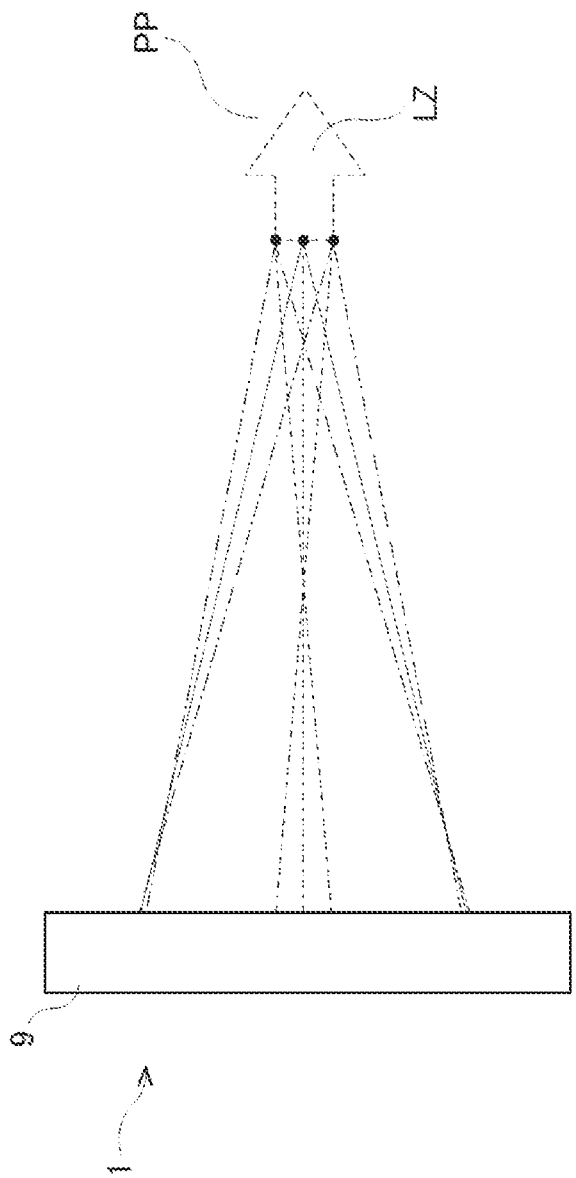
FIG. 15 is a diagram for explaining an example of a lighting method in the second embodiment.

In one aspect of a lighting method according to the second embodiment, as shown in FIG. 15, the second optical member 9 may concentrate the coherent light from the second projection optical system 81 onto the plane of projection PP. For example, the second optical member 9 concentrates the coherent light to a distance of several meters to several tens of meters from the lighting device 1. Accordingly, the width or diameter of a beam spot on a plane orthogonal to the optical axis of coherent light traveling out of the second optical member 9 becomes smaller toward the plane of projection PP. This lighting device 1 makes it possible to, by changing the optical path of the coherent light through the use of the scanner 5, change the direction of emission of the coherent light from the second optical member 9 and cause the position of incidence of the coherent light to move over the plane of projection PP.

By causing the coherent light to move at high speeds over the first optical member 7, the scanner 5 can cause the position of incidence of the coherent light on the plane of projection PP to move at high speeds. Assume, for example, that as shown in FIG. 15, a lighting zone LZ having an arrow pattern is set on the plane of projection PP. In this example, high-speed movement of the position of incidence of the coherent light within the lighting zone LZ allows an observer to visually identify the coherent light through an afterimage as being irradiated all over the lighting zone LZ. That is, the observer perceives the pattern of the lighting zone LZ as being displayed on the plane of projection PP. From this standpoint, it is preferable that the scanning frequency at which the scanner 5 causes the coherent light to move be higher than or equal to resolution of human vision. Specifically, the scanning frequency of the coherent light can be higher than or equal to 15 Hz, more preferably higher than or equal to 50 Hz.

Figure 16:
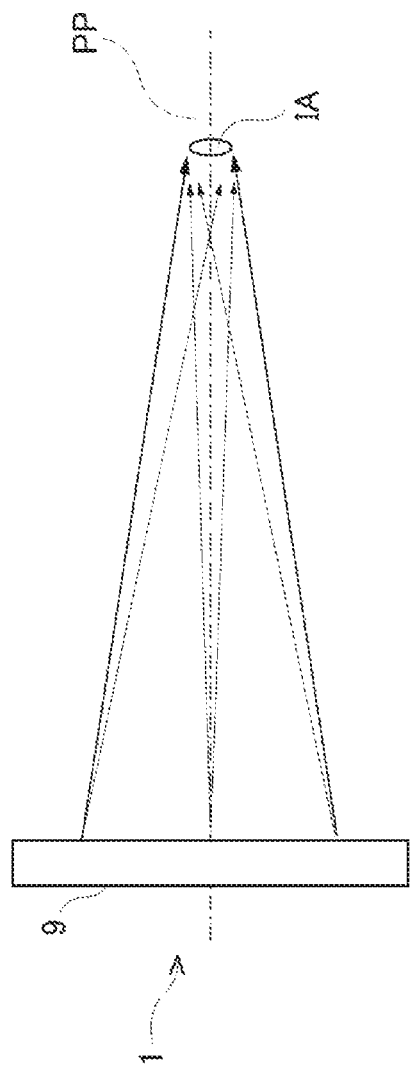
FIG. 16 is a diagram for explaining a modification of the second optical member.

Such a lighting method involving the use of the lighting device 1 according to the second embodiment is identical to the aforementioned lighting method involving the use of the lighting device 1 according to the first embodiment. In a case where the lighting device 1 according to the second embodiment is used too, the illuminations described with reference to FIGS. 13A to 13C can be performed. For example, the position of incidence of the coherent light may be caused to move over the plane of projection PP so that the predetermined pattern visually identified moves over the plane of projection PP. Further, as with the second projection optical system 8 according to the first embodiment, the second optical member 9 may have a diffusing function. This example makes it possible to, as shown in FIG. 16, increase the size of a beam spot (incidence area IA) that falls on the plane of projection PP at a given moment. It should be noted that FIG. 16 shows rays of light emitted from several positions on the second optical member 9 at a certain moment.

Furthermore, as in the case of the first embodiment, there are no particular limitations on the shape of a beam spot of a beam that is irradiated from the second optical member 9 toward the lighting zone LZ. The beam spot here refers to a region where coherent light traveling toward the lighting zone LZ passes over a plane orthogonal to the optical axis of the coherent light. The shape of a spot of a beam traveling toward the lighting zone LZ may for example be a circular shape or an oval shape. The diameter of the pupil of a human eye is normally approximately 2.5 mm to 4 mm. The diameter of a pupil dilated by disease or other factors (mydriasis) is said to be approximately 6 mm to 7 mm. Accordingly, from the standpoint of laser safety, the maximum width of a spot of a beam traveling toward the lighting zone LZ is preferably greater than 7 mm, more preferably greater than or equal to 10 mm, even more preferably greater than or equal to 15 mm. Further, from the standpoint of a high-definition pattern, the maximum width of a beam spot can be narrower than or equal to 30 mm. In the case of a circular beam spot, the diameter of the beam spot can be of the aforementioned size. Further, in the case of an oval beam spot, the length of the beam spot along the major axis can be of the aforementioned size. The shape and size of a beam spot of coherent light that travels from the second projection optical system 81 toward the second optical member 9 too can be set in the same manner as the shape and size of a beam spot of coherent light that travels from the second optical member 9 toward the lighting zone LZ.

Figure 17:
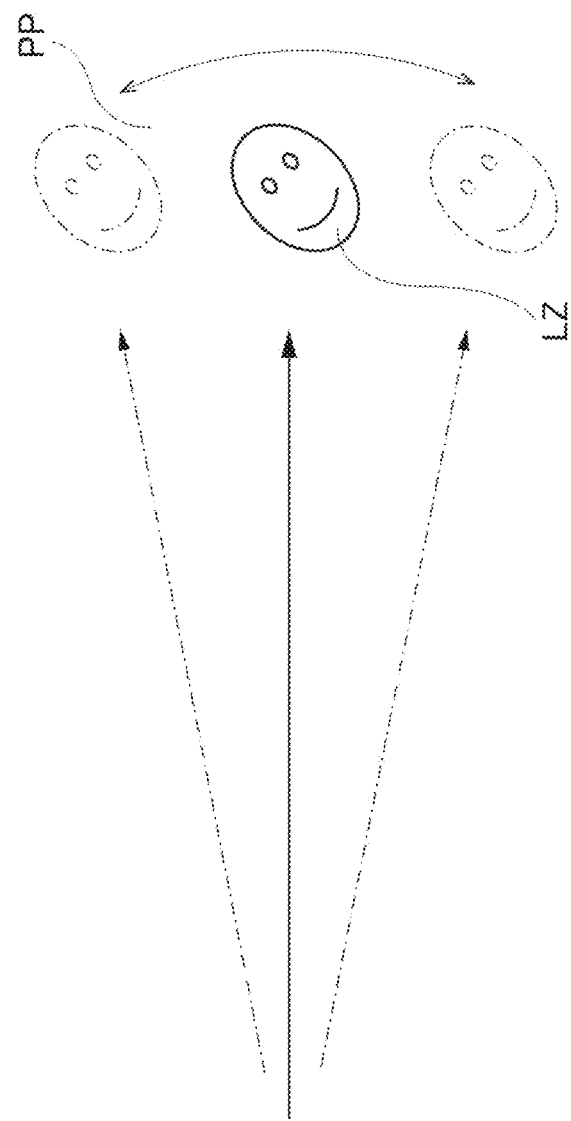
FIG. 17 is a diagram for explaining another example of a lighting method in the second embodiment.
Figure 17:
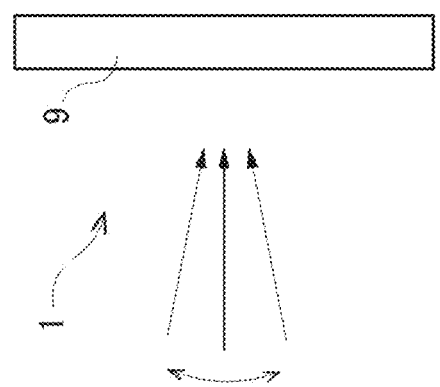

In another aspect of the lighting method according to the second embodiment, as shown in FIG. 17, the second optical member 9 may cause the coherent light from the second projection optical system 8 to diffuse, and the coherent light may be spread and projected onto the plane of projection PP having a predetermined pattern on the plane of projection PP. The pattern that is projected onto the plane of projection PP is not limited to a particular pattern but may be a pattern representing any one or more of a letter, a picture, a color pattern, a symbol, a mark, an illustration, a character, and a pictogram. In this aspect, by changing the optical path of the coherent light through the use of the scanner 5, the direction of incidence of the coherent light from the second projection optical member 81 onto the second optical member 9 can be changed as indicated by thick arrows in FIG. 17. By changing the direction of incidence of the coherent light onto the second optical member 9, the predetermined pattern visually identified can be caused to move over the plane of projection PP.

In the example shown in FIG. 17, by changing the direction of emission of the coherent light from the second optical member 9 at low speeds, a display pattern serving as the lighting zone LZ is visually identified as moving over the plane of projection PP. In this lighting method, a pattern displayed on the plane of projection PP needs only move at such a speed as to be able to be visually recognized by an observer. For example, the scanning frequency at which the scanner 5 causes the coherent light to move can be lower than 15 Hz, more preferably lower than or equal to 10 Hz. Further, the change in the direction of incidence of the coherent light from the second projection optical system 81 onto the second optical member 9 can be smaller than or equal to 800 (°/s), more preferably smaller than or equal to 600 (°/s). The speed of movement of the lighting zone LZ over the plane of projection PP can be lower than or equal to 140 mm/s, more preferably lower than or equal to 90 mm/s.

Figure 18:
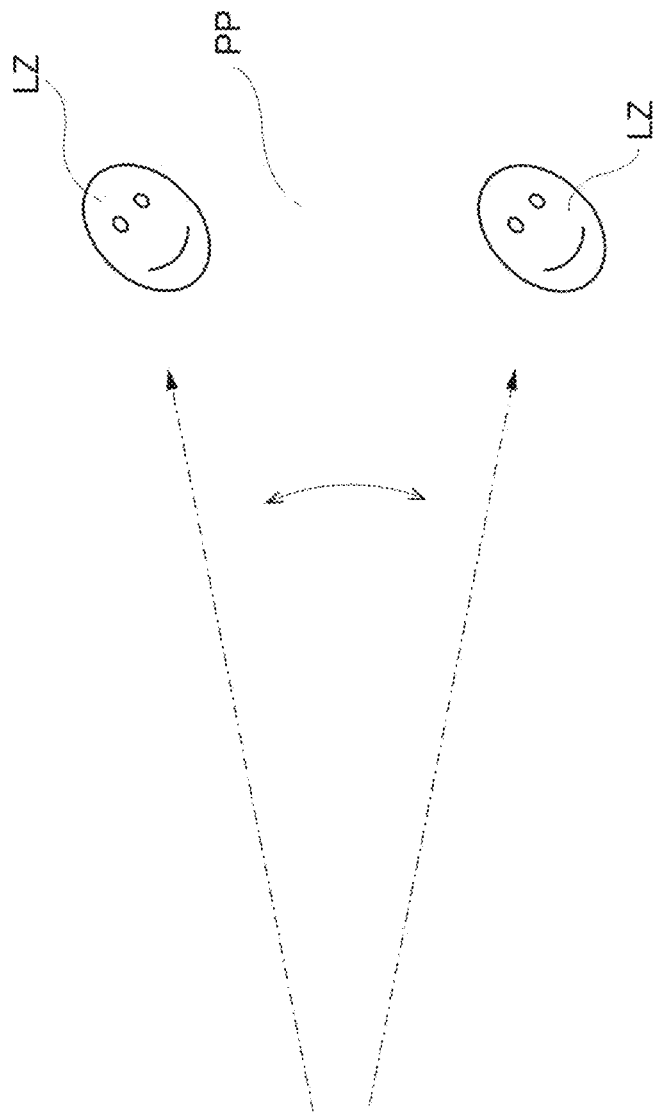
FIG. 18 is a diagram for explaining still another example of a lighting method in the second embodiment.

In still another lighting method shown in FIG. 18, unlike in the example shown in FIG. 17, the direction of emission of the coherent light from the second optical member 9 is changed at high speeds. Moreover, a plurality of predetermined patterns are visually identified on the plane of projection PP. In the lighting method shown in FIG. 18, the scanning frequency at which the scanner 5 causes the coherent light to move can be higher than or equal to 15 Hz, more preferably higher than or equal to 50 Hz. Further, the change in the direction of incidence of the coherent light from the second projection optical system 81 onto the second optical member 9 can be larger than 800 (°/s). Moreover, in the lighting method shown in FIG. 18, the light source 2 switches, according to operation of the scanner 5, between emitting the coherent light and stopping emitting the coherent light, or a shutter or other components may be used to switch between allowing and disallowing the light emitted from the light source 2 to travel. That is, the coherent light is intermittently emitted from the lighting device 1. During the time when the coherent light can be projected onto a region other than the lighting zone LZ on the plane of projection PP onto which the light should be irradiated, the coherent light may be inhibited from being emitted from the lighting device 1.

Further, according to the lighting device 1 according to the second embodiment, which has the aforementioned configuration, the first optical member 71 causes a beam irradiated from the first projection optical system 6 with the first spread angle θ1 to be diffusedly irradiated toward the second projection optical system 81 with the second spread angle θ2, which is larger than the first spread angle θ1. This makes it possible to more effectively improve the laser safety with which an observer looks directly at the lighting device 1.

Figure 7:
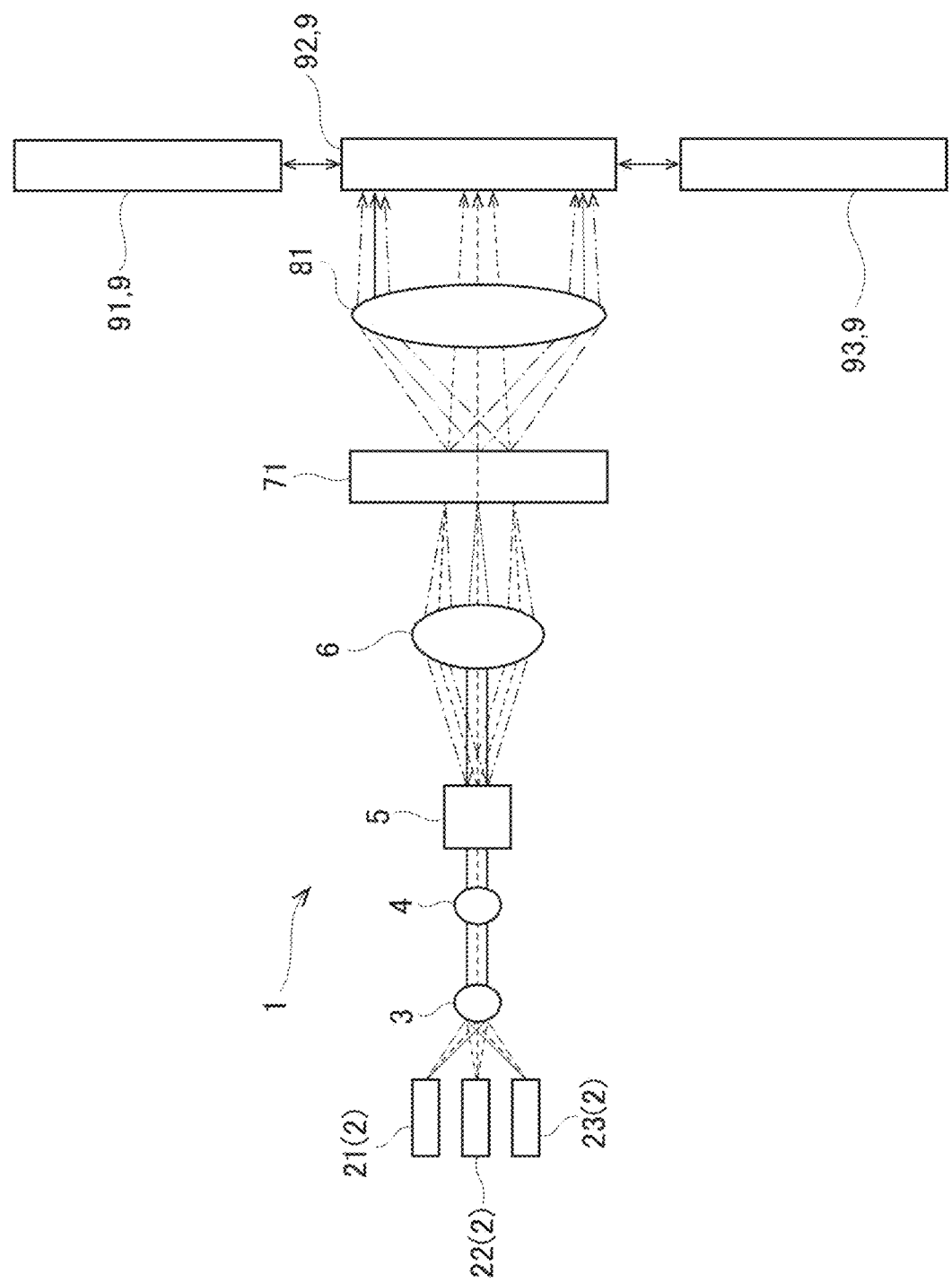
FIG. 7 is a schematic configuration diagram for explaining a lighting device according to a third embodiment of the present disclosure.
Figure 8:
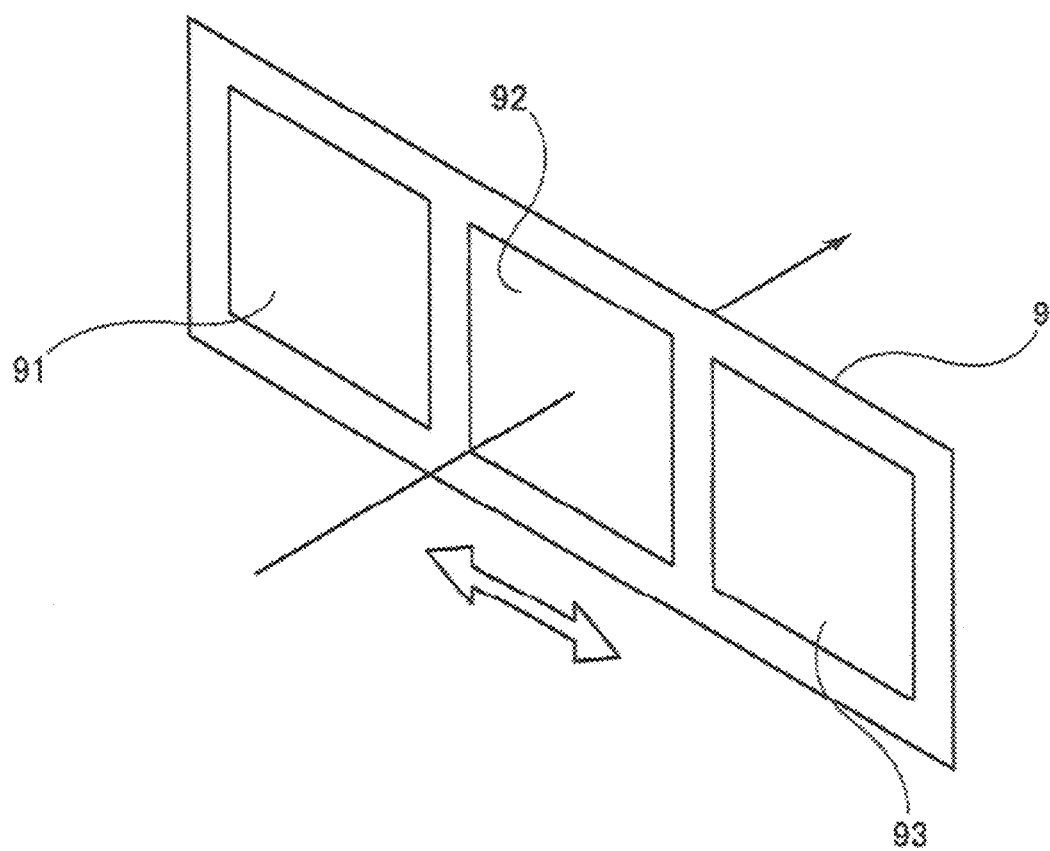
FIG. 8 is a perspective view for explaining an example of a second optical member that may be used in the lighting device of FIG. 7.
Figure 9:
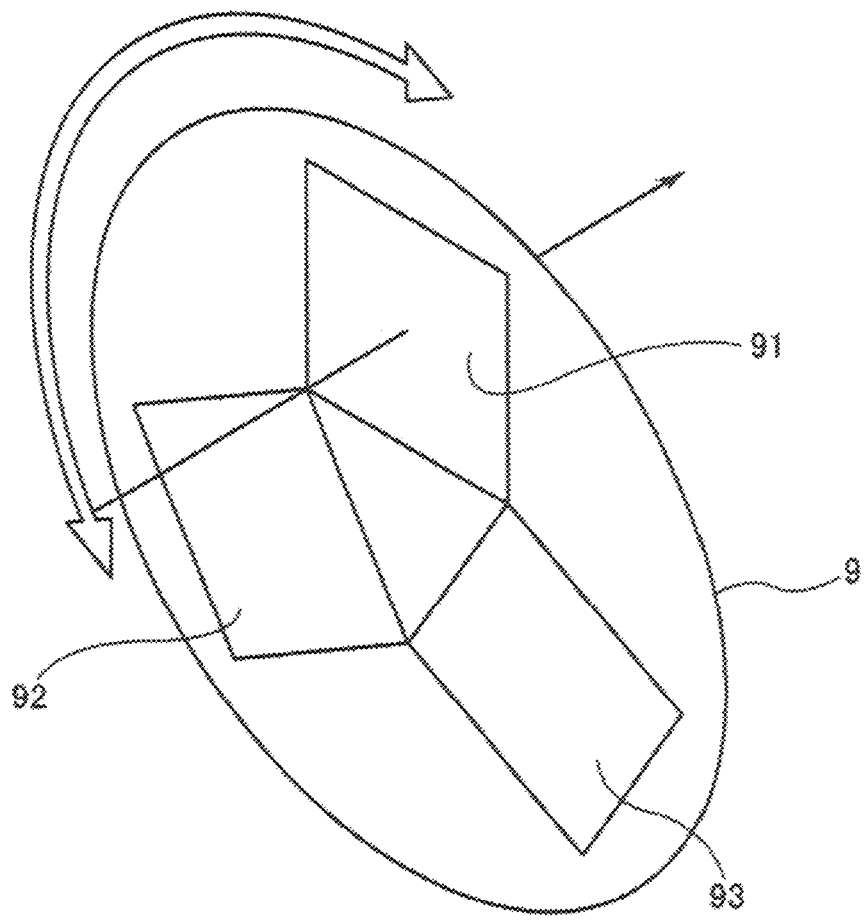
FIG. 9 is a perspective view for explaining another example of a second optical member that may be used in the lighting device of FIG. 7.
Figure 10:
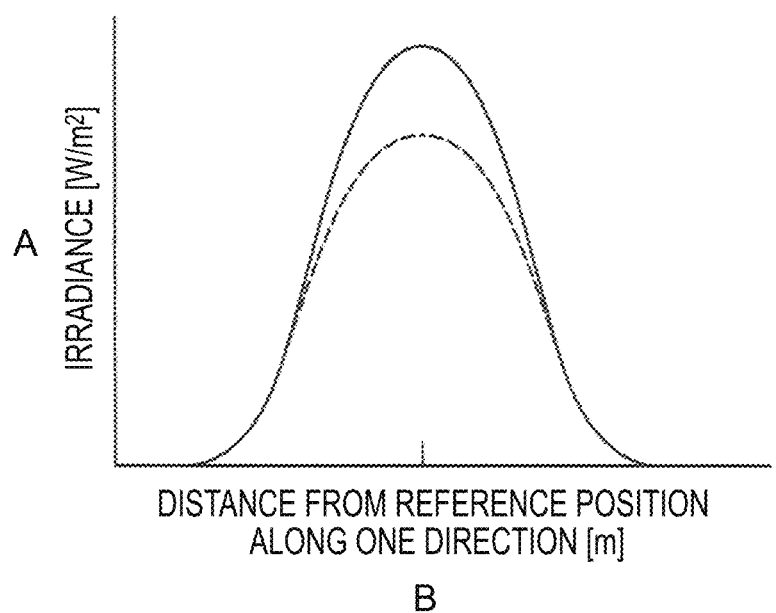
FIG. 10 is a graph showing a comparison between a diffraction characteristic of the second optical member with respect to coherent light of a design wavelength and a diffraction characteristic of the second optical member with respect to coherent light of a wavelength different from the design wavelength.
Figure 11:
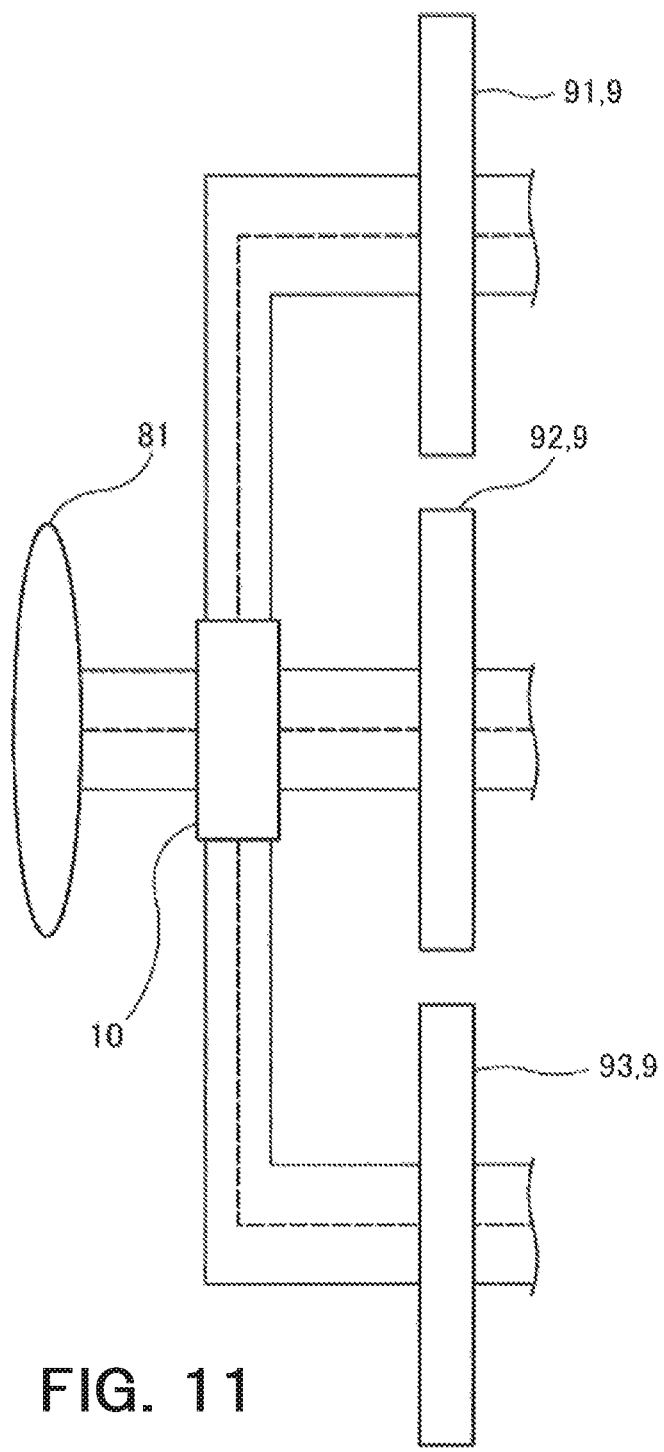
FIG. 11 is a diagram for explaining a modification of the lighting device according to the third embodiment, and is a schematic configuration diagram showing a second projection optical system, the second optical member, and nearby components.
Figure 12:
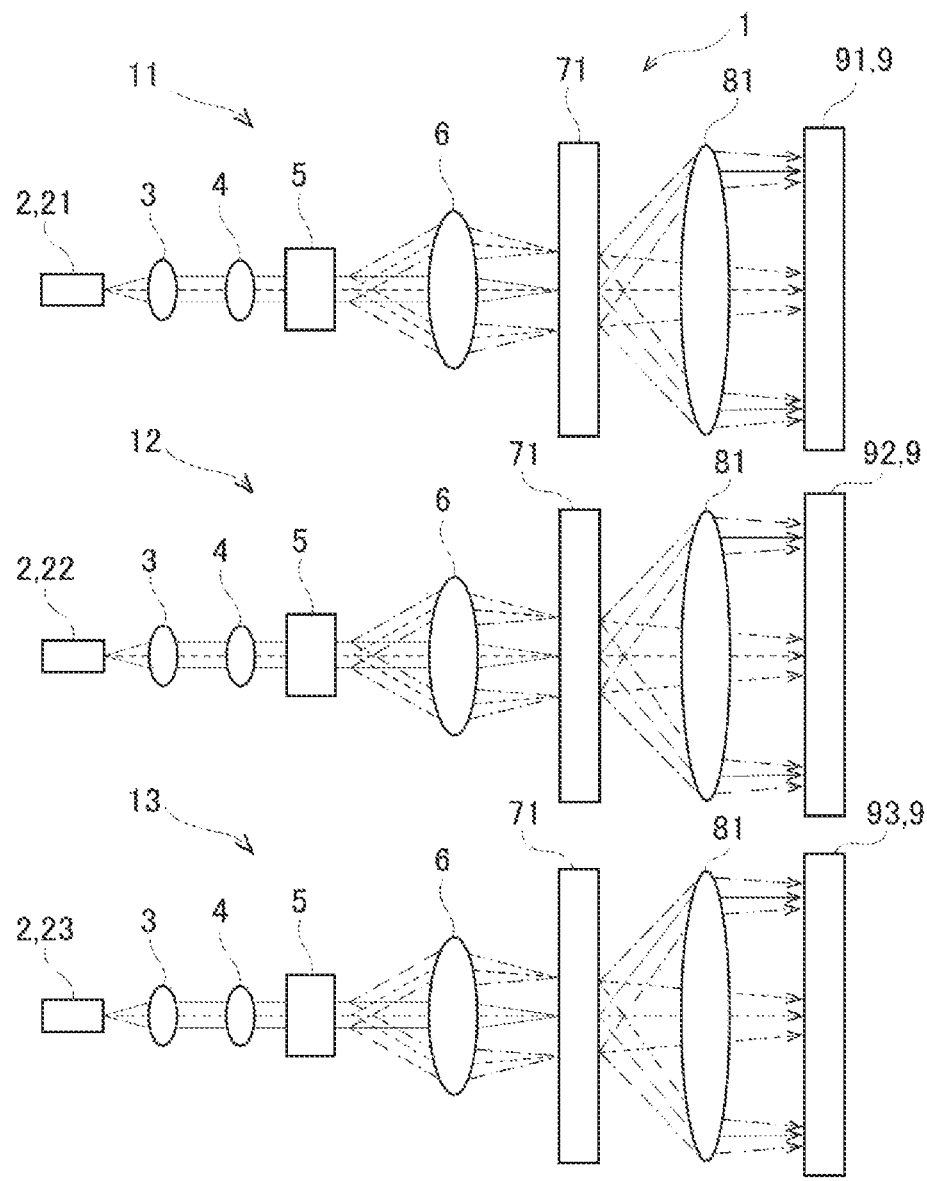
FIG. 12 is a diagram for explaining another modification of the lighting device according to the third embodiment.

A lighting device according to a third embodiment is described. FIG. 7 is a schematic configuration diagram showing the lighting device according to the third embodiment. FIG. 8 is a perspective view showing an aspect of a second optical member in the third embodiment. FIG. 9 is a perspective view showing another aspect of a second optical member in the third embodiment. FIG. 10 is a graph showing a profile of irradiance distribution within a beam spot of a beam that is irradiated from the second optical member onto a lighting zone when a beam of a wavelength band different from the designed wavelength of the second optical member falls on the second optical member. FIG. 11 is a diagram showing another aspect of a second projection optical system, the second optical system, and nearby components in the third embodiment, and FIG. 12 is a diagram showing another aspect of the lighting device according to the third embodiment. Those components of the third embodiment which are similar to those of the first and second embodiments are given identical reference signs, and a detailed description of such components is omitted.

The lighting device 1 according to the third embodiment illuminates a lighting zone LZ on a plane of projection PP with coherent light. The lighting device 1 according to the third embodiment is capable of a color display of a pattern corresponding to the lighting zone LZ. The lighting device 1 includes a light source 2, a condensing optical system 3, a collimating optical system 4, a scanner 5, a first projection optical system 6, a first optical member 71, and a second projection optical system 81, and a second optical member 9. The light source 2 includes a first light source 21, a second light source 22, and a third light source 23. The second optical member 9 includes a first light source optical member 91, a second light source optical member 92, and a third light source optical member 93.

The first light source 21, the second light source 22, and the third light source 23 emit rays of coherent light of different wavelength bands, respectively. The first light source 21 emits coherent light, for example, of a red wavelength band. The second light source 22 emits coherent light, for example, of a green wavelength band. The third light source 23 emits coherent light, for example, of a blue wavelength band. The first light source 21, the second light source 22, and the third light source 23 may emit rays of coherent light of wavelength bands other than the red, green, and blue wavelength bands.

The first light source optical member 91 is an optical member (such as a diffractive optical element) that corresponds to coherent light of a predetermined wavelength band that is emitted from the first light source 21. The second light source optical member 92 is an optical member (such as a diffractive optical element) that corresponds to coherent light of to a predetermined wavelength band that is emitted from the second light source 22. The third light source optical member 93 is an optical member (such as a diffractive optical element) that corresponds to coherent light of a predetermined wavelength band that is emitted from the third light source 23.

In the example shown in FIG. 7, the second optical member 9 is configured such that any of the first, second, and third light source optical members 91, 92, and 93 can be selected to be placed on the optical path of coherent light. In other words, the first light source optical member 91, the second light source optical member 92, and the third light source optical member 93 can be switched among as a second optical member to be placed in such a position as to be able to receive coherent light from the second projection optical system 81. The second optical member 9 is configured such that an optical member that exerts an optical effect on coherent light emitted from the light source 2 can be selected from among the first light source optical member 91, the second light source optical member 92, and the third light source optical member 93 according to the wavelength of the coherent light.

For example, as shown in FIG. 8, the second optical member 9 is configured such that the first light source optical member 91, the second light source optical member 92, and the third light source optical member 93 are arranged at regular intervals in a row. In the example shown in FIG. 8, by causing the second optical member 9 to undergo movement, in particular translation, an optical member corresponding to the wavelength of coherent light can be placed on the optical path of the coherent light. In the example shown in FIG. 8, the second optical member 9 is movable in a direction in which the first to third light source optical members 91 to 93 are arrayed.

In another example shown in FIG. 9, the second optical member 9 is configured to be rotatable. In this second optical member 9, the first light source optical member 91, the second light source optical member 92, and the third light source optical member 93 are placed at regular intervals in a circle. The second optical member 9 is rotatable on the center of the circle in which the first to third light source optical members 91 to 93 are arrayed. In the example shown in FIG. 9, by causing the second optical member 9 to undergo rotation, an optical member corresponding to the wavelength of coherent light can be placed on the optical path of the coherent light.

Incidentally, in the example shown in FIG. 7, the first optical member 71 regulates the optical path of the rays of coherent light that are emitted from the first, second, and third light sources 21, 22, and 23 of the light source 2. The first optical member 71 has its diffraction characteristics designed in accordance with a particular wavelength band. This results in a decrease in efficiency of diffraction of coherent light of a wavelength band different from the designed wavelength band. Coherent light of a wavelength band different from the designed wavelength band contains increased zero-order diffracted light. Assume, for example, that an irradiance distribution indicated by a dotted line in FIG. 10 is obtained from coherent light of the designed wavelength band by a diffraction characteristic of the first optical member 7. In a case where the first optical member 7 having this diffraction characteristic is used for coherent light of a wavelength band different from the designed wavelength band, an irradiance distribution indicated by a solid line in FIG. 10 is obtained. In the irradiance distribution indicated by a solid line in FIG. 1, there is a rise in irradiance at the center within a beam spot. This rise has an unfavorable effect on laser safety.

It is therefore preferable that the first optical member 7 be designed such that the irradiance distribution shown in FIG. 5C is obtained from coherent light of the design wavelength band. As mentioned above, in the irradiance distribution shown in FIG. 5C, an irradiance BC [W/m2] at the center within a beam spot of coherent light on a plane orthogonal to the optical axis of the coherent light, which is irradiated from the first optical member 71 onto the second projection optical system 8, is lower than an irradiance BE [W/m2] at an outer peripheral edge within the beam spot. Accordingly, sufficient improvement in laser safety can be brought about even if zero-order diffracted light is generated at the first optical member 7.

Further, it is also preferable that the irradiance distribution shown in FIG. 5C be obtained from coherent light emitted from each of the light sources 21 to 23. That is, it is preferable that as shown in FIG. 5C, an irradiance BC [W/m2] at the center within a region where coherent light emitted from each of the light sources 21 to 23 passes over a plane orthogonal to the optical axis of the coherent light be lower than an irradiance BE [W/m2] at an outer peripheral edge within the region. In this example too, improvement in laser safety can be brought about.

Although, in the third embodiment, the second optical member 9 is replaced, this is not intended to impose any limitation. For example, as shown in FIG. 11, an optical element 10 such as a diffraction grating may be provided between the second projection optical system 81 and the second optical member 9. This optical element 10 sorts coherent light from each of the light sources 21, 22, and 23 to a corresponding one of the first to third light source optical members 91, 92, and 93. Having such a configuration makes it unnecessary to switch the second optical member 9 for each of the wavelength bands of rays of coherent light that are emitted from the light sources 21 to 23.

Further, in the third embodiment, the size of a scanning region of coherent light that falls on the first optical member 71 may vary according to the wavelength band of the coherent light. By being diffracted by the first optical member 71, coherent light of a larger wavelength band spreads into a larger angular range. Accordingly, assuming that rays of coherent light from the light sources 21 to 23 are identical in the size of a region of incidence on the first optical member 7, i.e. a scanning region, there are variations in the angular range within which the rays of coherent light from the light sources 21 to 23 are diffused by the first optical member 71. This results in variations in the lighting zone LZ on the plane of projection PP among the rays of coherent light from the light sources 21 to 23. This may cause a color change at a peripheral edge of a pattern that is observed on the plane of projection PP.

This problem may be addressed by causing the size of a scanning region on the first optical member 71 on which the coherent light falls to vary according to the wavelength band of the coherent light. More specifically, the size of a scanning region on the first optical member 71 on which the coherent light comes to fall vary among the plural rays of coherent whose wavelengths are not identical to each other. A scanning region of a first ray of coherent light of a first wavelength band is smaller than a scanning region of a second ray of coherent light of a second wavelength band that is shorter than the first wavelength band. A scanning region of a first ray of coherent light of a first wavelength band may be contained in a scanning region of a second ray of coherent light of a second wavelength band that is shorter than the first wavelength band. That is, on the first optical member 71, the scanning region of the first ray of coherent light may be located inside the scanning region of the second ray of coherent light.

Alternatively, as shown in FIG. 12, the lighting device 1 according to the third embodiment may include a first lighting device 11, a second lighting device 12, and a third lighting device 13. The first lighting device 11 includes a first light source 21, a condensing optical system 3, a collimating optical system 4, a scanner 5, a first projection optical system 6, a first optical member 71, a second projection optical member 81, and a first light source optical member 91. The second lighting device 12 includes a second light source 22, a condensing optical system 3, a collimating optical system 4, a scanner 5, a first projection optical system 6, a first optical member 71, a second projection optical member 81, and a second light source optical member 92. The third lighting device 13 includes a third light source 23, a condensing optical system 3, a collimating optical system 4, a scanner 5, a first projection optical system 6, a first optical member 71, a second projection optical member 81, and a third light source optical member 93. The first to third lighting devices 11 to 13 are arranged parallel to one another. In the lighting device 1 shown in FIG. 12, there may be differences in distance and direction from the light source optical members 91 to 93 to an irradiated region LZ. These differences may be handled by adjusting the diffraction characteristics of the light source optical members 91 to 93.

The embodiments described above are described to facilitate understanding of the present disclosure, and are not described to limit the present disclosure. Accordingly, each of the elements disclosed in the foregoing embodiments is intended to include all design changes and equivalents belonging to the technical scope of the present disclosure.

The invention claimed is:

1. A lighting device comprising:
a light source that emits coherent light;
a scanner that causes the coherent light emitted from the light source to move;
a first optical system that regulates an optical path of the coherent light from the scanner;
a first optical member that causes the coherent light from the first optical system to diffuse;
a second optical system that regulates an optical path of the coherent light from the first optical member; and
a second optical member that directs the coherent light from the second optical system toward a lighting zone on a plane of projection,
wherein
the lighting zone on the plane of projection is illuminated with the coherent light from the second optical member, and
an irradiance [W/m2] in a plane orthogonal to an optical axis of the coherent light irradiated on the lighting zone is non-discrete.

2. The lighting device according to claim 1, wherein the second optical member causes the coherent light from the second optical system to diffuse, and the coherent light is spread and projected onto the lighting zone having a predetermined pattern on the plane of projection.

3. The lighting device according to claim 2, wherein
a direction of emission of the coherent light from the second optical member changes according to an optical path determined by the scanner, and
by causing the coherent light to move, the scanner causes the predetermined pattern visually identified to move over the plane of projection.

4. The lighting device according to claim 2, wherein
a direction of emission of the coherent light from the second optical member changes according to an optical path determined by the scanner, and
the scanner causes the coherent light to move so that a plurality of the predetermined patterns are visually identified on the plane of projection.

5. The lighting device according to claim 1, wherein
a direction of emission of the coherent light from the second optical system changes according to an optical path determined by the scanner, and
by causing the coherent light to move, the scanner causes a position of incidence of the coherent light to move within the lighting zone visually identified as a predetermined pattern.

6. The lighting device according to claim 5, wherein the position of incidence of the coherent light is caused to move over the plane of projection so that the predetermined pattern visually identified moves over the plane of projection.

7. The lighting device according to claim 1, wherein a beam spot of the coherent light irradiated on the lighting zone has a maximum width greater than 7 mm.

8. The lighting device according to claim 1, wherein the first optical member is provided at a back focal position of the first optical system and a front focal position of the second optical system.

9. The lighting device according to claim 1, wherein a beam spot of the coherent light irradiated on the second optical member has a maximum width greater than 7 mm.

10. The lighting device according to claim 1, wherein the scanner causes the coherent light to move at a scanning frequency higher than or equal to 15 [Hz].

11. The lighting device according to claim 1, wherein the scanner causes the coherent light to move along a predetermined pattern.

12. The lighting device according to claim 1, wherein
a direction of emission of the coherent light from the second optical member changes according to an optical path determined by the scanner, and
by causing the coherent light to move, the scanner causes a position of incidence of the coherent light to move within the lighting zone visually identified as a predetermined pattern.

13. The lighting device according to claim 1, wherein
a distribution of irradiance along a certain direction within a region where the coherent light passes over a plane orthogonal to an optical axis of the coherent light traveling from the lighting device toward the lighting zone does not include a local minimum value of irradiance within a range between two half-value positions, located on both sides of a maximum position at which a maximum irradiance is obtained, at each of which an irradiance half as high as the maximum irradiance is obtained, or
a local minimum value of irradiance exists within the range and a proportion of a difference between a smaller local maximum value of local maximum values of irradiance obtained at two local maximum-value positions located on both sides of a local minimum-value position at which the local minimum value is obtained and the local minimum value to the smaller local maximum value is lower than or equal to 20 [%].

14. The lighting device according to claim 1, wherein a distribution of irradiance along a certain direction within a region where the coherent light passes over a plane orthogonal to an optical axis of the coherent light traveling from the lighting device toward the lighting zone has an irradiance higher than or equal to 80 [%] of a maximum irradiance in 70 [%] or more of a range between two half-value positions, located on both sides of a maximum position at which the maximum irradiance is obtained, at each of which an irradiance half as high as the maximum irradiance is obtained.

15. The lighting device according to claim 1, wherein
the light source includes a plurality of light sources that emit rays of coherent light whose wavelengths are different from each other, and
the second optical member incudes a plurality of second optical members that correspond separately to each of the rays of coherent light from the plurality of light sources.

16. The lighting device according to claim 1, wherein
the light source includes a plurality of light sources that emit rays of coherent light whose wavelengths are different from each other, and
a size of a scanning region on the first optical member on which the coherent light comes to fall varies among the rays of coherent light from the plurality of light sources.

17. A lighting method, comprising the steps of:
preparing a lighting device including a light source that emits coherent light, a scanner that causes the coherent light emitted from the light source to move, a first optical system that regulates an optical path of the coherent light from the scanner, a first optical member that causes the coherent light from the first optical system to diffuse, and a second optical system that regulates an optical path of the coherent light from the first optical member; and
illuminating a lighting zone on a plane of projection with the coherent light from the second optical system, wherein
in the illuminating step, by changing an optical path of the coherent light using the scanner, a direction of emission of the coherent light from the second optical member is changed and a position of incidence of the coherent light is caused to move over the plane of projection,
the lighting device further includes a second optical member that causes the coherent light from the second optical system to diffuse and spreads the coherent light onto the lighting zone having a predetermined pattern on the plane of projection, and
in the illuminating step, by changing an optical path of the coherent light using the scanner, the predetermined pattern visually identified is caused to move over the plane of projection.

18. A lighting method, comprising the steps of:
preparing a lighting device including a light source that emits coherent light, a scanner that causes the coherent light emitted from the light source to move, a first optical system that regulates an optical path of the coherent light from the scanner, a first optical member that causes the coherent light from the first optical system to diffuse, and a second optical system that regulates an optical path of the coherent light from the first optical member; and
illuminating a lighting zone on a plane of projection with the coherent light from the second optical system, wherein
in the illuminating step, by changing an optical path of the coherent light using the scanner, a direction of emission of the coherent light from the second optical member is changed and a position of incidence of the coherent light is caused to move over the plane of projection,
the lighting device further includes a second optical member that causes the coherent light from the second optical system to diffuse and spreads the coherent light onto the lighting zone having a predetermined pattern on the plane of projection, and
the scanner causes the coherent light to move so that a plurality of the predetermined patterns are visually identified on the plane of projection.

* * * * *